(12) United States Patent
Bilas et al.

(10) Patent No.: US 10,257,274 B2
(45) Date of Patent: Apr. 9, 2019

(54) TIERED HETEROGENEOUS FAST LAYER SHARED STORAGE SUBSTRATE APPARATUSES, METHODS, AND SYSTEMS

(71) Applicant: Foundation for Research and Technology—Hellas (FORTH), Heraklion, Crete (GR)

(72) Inventors: Angelos Bilas, Heraklion (GR); Markos Fountoulakis, Crete (GR); Spyros Papageorgiou, Crete (GR); Tryfon Farmakakis, Crete (GR)

(73) Assignee: FOUNDATION FOR RESEARCH AND TECHNOLOGY—HELLAS (FORTH), Heraklion (GR)

( * ) Notice: Subject to any disclaimer, the term of this patent is extended or adjusted under 35 U.S.C. 154(b) by 404 days.

(21) Appl. No.: 14/854,911

(22) Filed: Sep. 15, 2015

(65) Prior Publication Data
US 2016/0080495 A1 Mar. 17, 2016

Related U.S. Application Data

(60) Provisional application No. 62/050,257, filed on Sep. 15, 2014.

(51) Int. Cl.
*H04L 29/08* (2006.01)
*H04L 12/26* (2006.01)
*G06F 3/06* (2006.01)

(52) U.S. Cl.
CPC ........ *H04L 67/1097* (2013.01); *G06F 3/0604* (2013.01); *G06F 3/065* (2013.01);
(Continued)

(58) Field of Classification Search
CPC . H04L 67/1002; H04L 67/1097; H04L 43/10; H04L 43/0817; G06F 3/065;
(Continued)

(56) References Cited

U.S. PATENT DOCUMENTS 5,987,506 A * 11/1999 Carter ................... G06F 9/5016
707/999.01
6,275,867 B1 * 8/2001 Bendert ................ G06F 9/5088
719/316

(Continued)

FOREIGN PATENT DOCUMENTS

| CA | 2705221 A1 * | 5/2009 | ......... G06F 12/0813 |
| JP | 2005128657 A * | 5/2005 | |
| WO | WO 2009062063 A1 * | 5/2009 | ......... G06F 12/0813 |

OTHER PUBLICATIONS

International Search Report and Written Opinion, dated Jan. 14, 2016 for PCT International Application No. PCT/EP2015/071144, filed Sep. 15, 2015.

*Primary Examiner* — Kostas J Katsikis
(74) *Attorney, Agent, or Firm* — Norton Rose Fulbright US LLP

(57) ABSTRACT

A storage system for organizing and maintaining metadata in a distributed network. The system includes: a network; a plurality of distributed nodes configured to communicate through the network; a plurality of block devices configured to communicate with the plurality of distributed nodes through the network; and a management server configured to communicate with each of the plurality of distributed nodes and block devices and further configured to arbitrarily associate metadata and data to any of the plurality of distributed nodes such that a global copy of the metadata does not exist in one or more fixed locations known to all distributed nodes.

18 Claims, 21 Drawing Sheets

(52) U.S. Cl.
CPC ............ *G06F 3/067* (2013.01); *G06F 3/0643* (2013.01); *G06F 3/0647* (2013.01); *H04L 43/0817* (2013.01); *H04L 43/10* (2013.01); *H04L 67/1002* (2013.01)

(58) Field of Classification Search
CPC ...... G06F 3/067; G06F 3/0604; G06F 3/0643; G06F 3/0647
See application file for complete search history.

(56) References Cited

U.S. PATENT DOCUMENTS

| | | | | |
|---|---|---|---|---|
| 7,653,668 B1* | 1/2010 | Shelat | ................ | G06F 11/2094 707/610 |
| 9,378,067 B1* | 6/2016 | Agarwala | ......... | G06F 15/17331 |
| 9,720,619 B1* | 8/2017 | Shah | ....................... | G06F 3/065 |
| 2002/0078174 A1* | 6/2002 | Sim | ................... | G06F 17/30194 709/219 |
| 2002/0083120 A1* | 6/2002 | Soltis | .................... | G06F 3/0605 709/200 |
| 2002/0133491 A1* | 9/2002 | Sim | ................... | G06F 17/30067 |
| 2004/0122917 A1* | 6/2004 | Menon | ............. | G06F 17/30194 709/219 |
| 2004/0215878 A1* | 10/2004 | Takata | .................. | G06F 3/0604 711/114 |
| 2005/0262245 A1* | 11/2005 | Menon | ............ | H04N 21/23103 709/226 |
| 2005/0262246 A1* | 11/2005 | Menon | ............ | H04N 21/23103 709/226 |
| 2007/0016822 A1* | 1/2007 | Rao | ....................... | G06F 9/5061 714/4.11 |
| 2007/0260476 A1* | 11/2007 | Smolen | ............. | G06F 17/30348 705/1.1 |
| 2009/0037451 A1* | 2/2009 | Borrill | ............. | G06F 17/30212 |
| 2009/0150511 A1* | 6/2009 | Gross | ................... | G06F 12/0813 709/213 |
| 2012/0278283 A1* | 11/2012 | Hildebrand | ........... | G06F 11/203 707/634 |
| 2013/0054727 A1 | 2/2013 | Kumano et al. | | |
| 2013/0055371 A1* | 2/2013 | Kumano | ............ | H04L 67/1097 726/7 |
| 2013/0073821 A1* | 3/2013 | Flynn | ..................... | G06F 3/061 711/162 |
| 2013/0227236 A1* | 8/2013 | Flynn | .................... | G11C 16/26 711/165 |
| 2013/0305002 A1 | 11/2013 | Hallak et al. | | |
| 2014/0304473 A1 | 10/2014 | Zachariassen et al. | | |
| 2015/0154227 A1* | 6/2015 | Wang | ................ | G06F 17/30233 707/827 |

* cited by examiner

Fig. 20
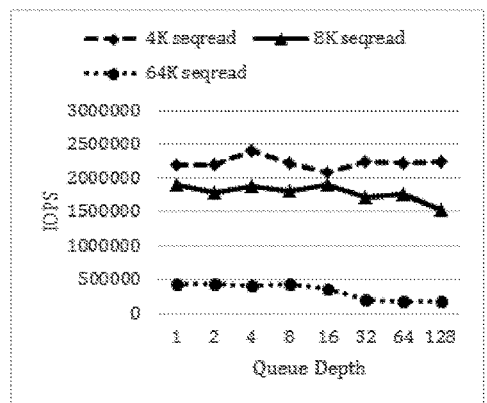
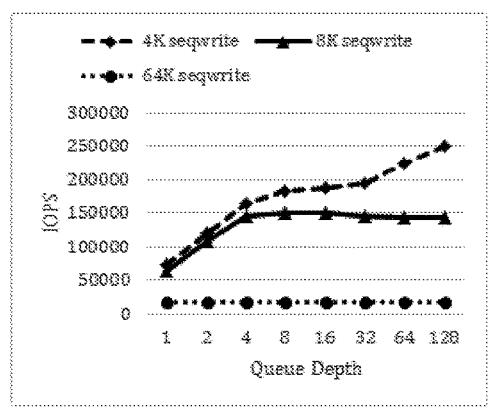
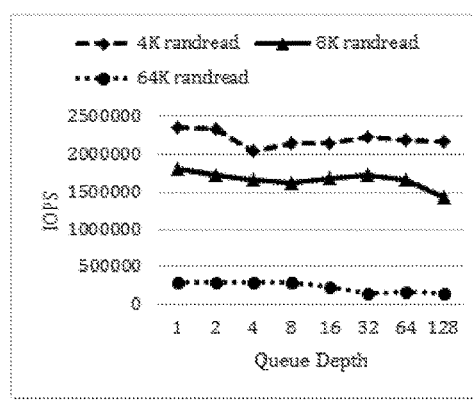
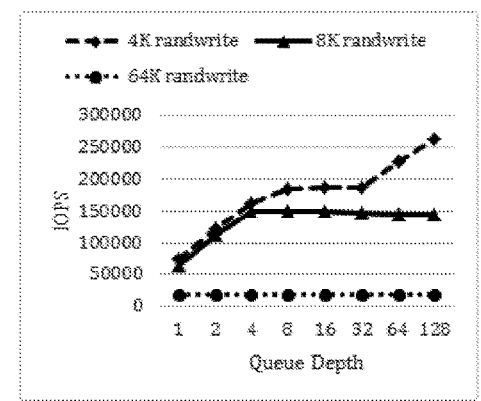

TIERED HETEROGENEOUS FAST LAYER SHARED STORAGE SUBSTRATE APPARATUSES, METHODS, AND SYSTEMS

CROSS-REFERENCE TO RELATED APPLICATION

This application claims priority under 35 U.S.C. § 119 to U.S. Provisional Patent Application No. 62/050,257, filed Sep. 15, 2014, the contents of which are incorporated by reference herein in their entirety.

FIELD

The present subject matter is directed generally to apparatuses, methods, and systems for data storage, manipulation and management, and more particularly, to TIERED HETEROGENEOUS FAST LAYER SHARED STORAGE SUBSTRATE APPARATUSES, METHODS, AND SYSTEMS (hereinafter TFL).

BACKGROUND

Storage technology is at the heart of modern data centers and Big Data applications. Storage performance and manageability continue to be important concerns for storage systems and in particular to the total cost of ownership of such systems. Recent improvements in storage devices using NAND flash memory, such as solid-state drives (SSDs) have resulted in significant changes to storage architectures. Currently, such devices are used in different forms in most storage systems as a fast storage tier. Storage device technology will continue to affect storage systems and architectures in a profound manner. There are two aspects of existing and emerging fast storage devices that are not handled properly by currently known systems: performance and heterogeneity.

Regarding performance, known storage systems are typically designed to operate in the millisecond-range. Even with SSDs, typical storage input/output (I/O) latencies are in the order of hundreds of microseconds, which allows the overhead of the systems software that provides the required storage abstraction and manageability to be hidden. However, as storage device performance begins to improve as projected, with device latencies in the order of a few microseconds, e.g. in the lops range, current approaches to designing storage systems will not scale with the performance (latency and I/O operation rate) of such devices. Systems software and storage protocol overhead are the main bottleneck when it comes to performance.

Current systems are also insufficient when it comes to handling heterogeneous networks, that is, a network connecting computers and other devices with different operating systems and/or different protocols. As device performance improves, storage systems will be required to cope with different types of devices, at least SSDs and magnetic hard disk drives (HDDs). Current storage systems are designed to operate in a different manner when accessing SSDs or HDDs, where for instance SSDs are organized as a separate cache and the path for I/O operations is fixed. Similarly, HDDs are typically combined in RAID (Redundant Array of Independent Disks) arrays that require devices with similar characteristics. These restrictions, which require the careful organization of devices into tiers or arrays within a storage system, create complex and inflexible configurations that are hard to evolve over time and introduce significant management overhead.

SUMMARY

A storage system for organizing and maintaining metadata in a distributed network is disclosed. The system includes: a network; a plurality of distributed nodes configured to communicate through the network; a plurality of block devices configured to communicate with the plurality of distributed nodes through the network; and a management server configured to communicate with each of the plurality of distributed nodes and block devices and further configured to arbitrarily associate metadata and data to any of the plurality of distributed nodes such that a global copy of the metadata does not exist in one or more fixed locations known to all distributed nodes.

A processor-implemented method of organizing and maintaining metadata in a distributed network is also disclosed. The method includes arbitrarily associating metadata to any of a plurality of distributed nodes on a network, wherein each of the plurality of distributed nodes is associated with a block device, such that a global copy of the metadata does not exist in one or more fixed locations known to all distributed nodes. Each of the plurality of distributed nodes is configured to maintain precise metadata for the data it stores locally, without maintaining any metadata for data stored on other distributed nodes in the system.

A processor-implemented method of handling I/O operations is also disclosed. The method includes: receiving an I/O request at a distributed node on a network from a locally running application, and determining, by the distributed node, whether the data requested is local. When the data is local, metadata associated with the data and stored locally at the distributed node may be used to serve the I/O request. When the data is not local, the node may inquire of a plurality of other distributed nodes in the network to determine which of the other distributed nodes have replicas of the requested data, and may choose a replica to serve the I/O request.

BRIEF DESCRIPTION OF THE DRAWINGS

The accompanying drawings illustrate various non-limiting, example, inventive aspects of TFL:

FIG. 20 shows a sampling of indicative performance figures for one implementation of TFL.

DETAILED DESCRIPTION

Figure 1:
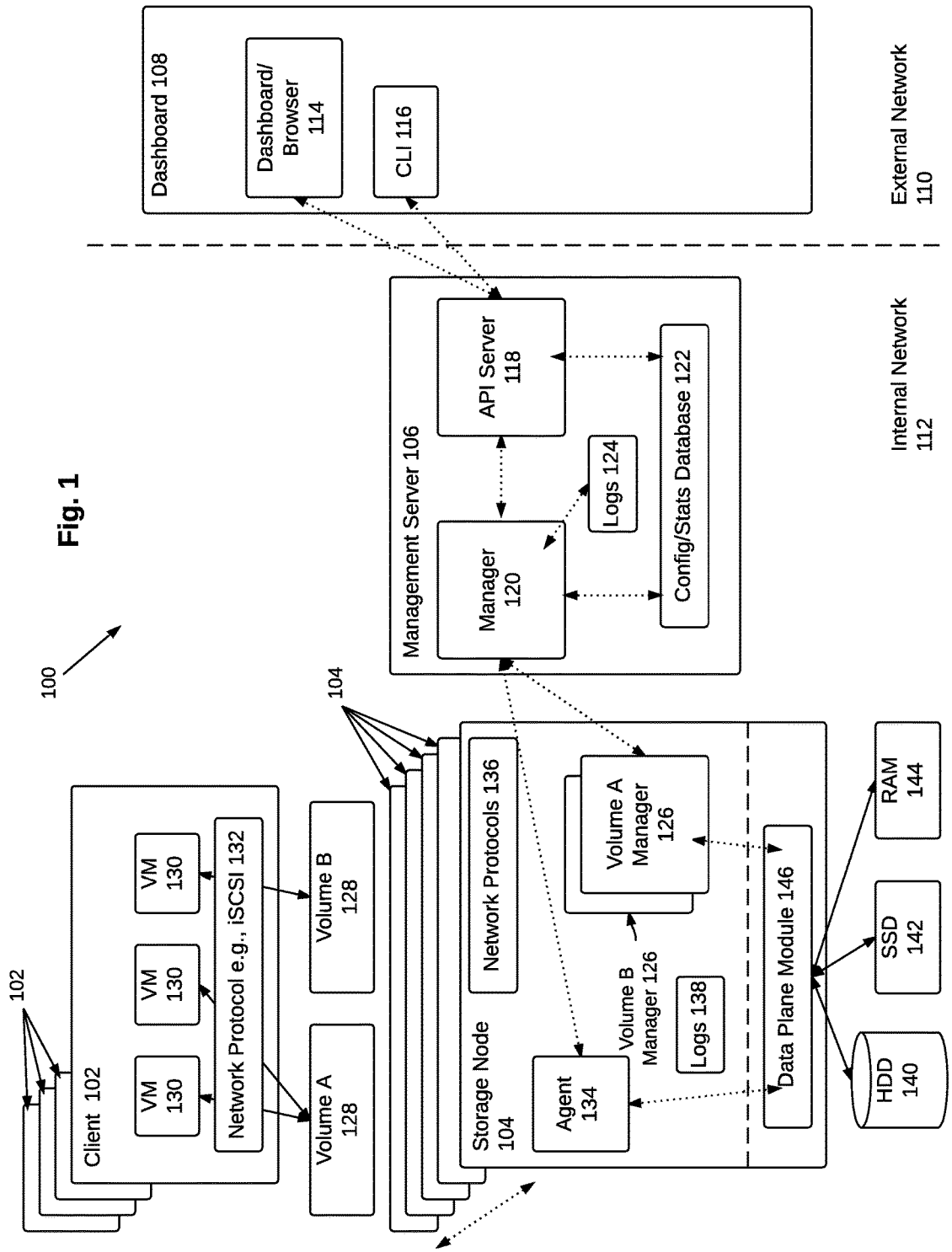
FIG. 1 shows a block diagram illustrating the network architecture, according to an implementation of TFL.

The TIERED HETEROGENEOUS FAST LAYER SHARED STORAGE SUBSTRATE APPARATUSES, METHODS, AND SYSTEMS ("TFL") is a storage system that is capable of handling the increased performance demands as memory technology advances and is also capable of handling the needs of heterogeneous networks.

TFL manages heterogeneous storage devices attached to multiple servers and presents to applications shared storage, in the form of block devices. TFL allows data to be placed on any storage device that participates in the system, without inherent restrictions. TFL assumes control of application access to data. It offers near-native performance for local data and optimizes performance of accesses to remote data. In particular, reads to local data do not require additional coordination across nodes. TFL offers fast replicated writes, without additional network messages (to the data itself), at least when a replica is available locally where the write occurs. TFL provides distributed snapshots at low cost. TFL enables the efficient creation of policies to optimize application performance, system cost, device efficiency, system manageability, etc. TFL provides elasticity in terms of devices and servers; users can add/remove devices and servers at will. TFL tolerates a configurable number of failures per volume even if that number is different for each volume, tolerates global system failures, and deals with system partitions. TFL scales Input/Output (I/O) performance with all resources involved, such as cores, storage devices, and network links.

As device latencies decrease, it is inevitable that large capacity devices will need to be co-located with computation. But in addition to performance, storage systems require strong reliability and availability guarantees. All storage systems are required to support some form of replication (or coding) for achieving data redundancy as well as offering multiple paths to data. In converged storage systems, the network itself becomes an important component for write I/O operations that need to be replicated (or encoded in a redundant manner). Storage devices are more likely to be distributed in servers for reasons of cost and performance.

Future storage devices will likely be distributed in servers for performance and cost reasons. TFL is well-suited for use with such systems because it does not require any particular arrangement of devices. Devices having any characteristics can merely be added or removed from the system and TFL automatically takes into account their characteristics during system operation. TFL supports all mainstream use-cases for storage systems, provisioning space for individual applications and sharing data in a single storage device.

The description and figures illustrate exemplary embodiments of TFL. For example, the principles described could be implemented with a variety of storage devices and architectures. It will thus be appreciated that those skilled in the art will be able to devise various arrangements that, although not explicitly described or shown herein, embody the principles of TFL.

FIG. 1 shows one exemplary embodiment of system architecture for a TFL system 100, although there are many other possible configurations to implement TFL. TFL system 100 may be implemented partially in an operating system kernel/hypervisor, and partially in user-space. Kernel space is typically reserved for running a privileged operating system kernel, while user-space is the memory area where application software is typically executed. Hypervisor is a piece of computer software, firmware, or hardware that creates and runs virtual machines. In one embodiment, the kernel portion of TFL is responsible for handling common-case operations, such as read/write operations, and I/O operations, while the user-space portion of TFL performs all management, policy, monitoring, and configuration operations and ensures flexibility and maintainability of TFL system 100.

As shown in FIG. 1, TFL system 100 may include a plurality of physical or virtual nodes in any combination. A node is a computer or other device with a unique network address. TFL system 100 may include a plurality of client nodes 102, storage nodes 104, management nodes 106, and dashboard nodes 108. The solid two-way arrows shown in FIG. 1 represent pre-existing APIs (Application Programming Interfaces) or protocols, while the dotted two-way arrows represent APIs or protocols that are unique to TFL system 100. Although only one dashboard node 108 and one management node 106 is shown in FIG. 1, it should be understood that any suitable number of any type of node may be present in TFL system 100.

In the embodiment shown, dashboard node 108 is located on an external network 110, while management nodes 106, storage nodes 104, and client nodes 102 are located on an internal network 112, although other configurations are also possible. Dashboard node 108 may be a computer, a thin-client, or other user device that allows a user to access TFL system 100 through any suitable user interface, including, for example, a graphical user interface such as a dashboard web browser 114 or a command-line interface (CLI) 116. These user interfaces are in communication with components of management node 116, for example, an API Server 118, which allows the user to monitor and perform changes to the state and configuration of TFL system 100. As shown in FIG. 1, management server 106 may also include a manager component 120 interfacing with API server 118 as well as with components of storage node 104. Manager component 120 may also be configured to interface with a configuration/statistics database 122 and a log 124 to record information regarding the operation of TFL system 100.

Each storage node 104 may include a plurality of components as well. For example, storage node 104 may include a volume manager 126 interfacing with manager component 120 of management server 106. As shown in FIG. 1, each volume of storage 128, may be managed by a separate volume manager 126 in each participating node. In other implementations, there may be multiple volume managers per volume per node (e.g. one per target), or a single volume manager for multiple volumes per node. Volumes 128 may be configured to interface with virtual machines 130 within client node 102 through any suitable network protocol 132. In one embodiment, network protocol 132 may be iSCSI (Internet Small Computer System Interface), which works on top of the Transport Control Protocol (TCP) and allows the SCSI command to be sent end-to-end over local area networks, wide-area networks, or the internet.

Storage node 104 may also include agents 134 configured to interface with manager component 120 of management server 106 and other storage node agents through various network protocols 136. Storage node 104 may also include logs 138 to record information at configurable log levels. Agent 134 may also be configured to interface with a plurality of heterogeneous storage devices, including hard-disk drives (HDD) 140, solid-state drives (SSD) 142, and Random Access Memory (RAM) 144, through a data plane module 146.

Figure 2:
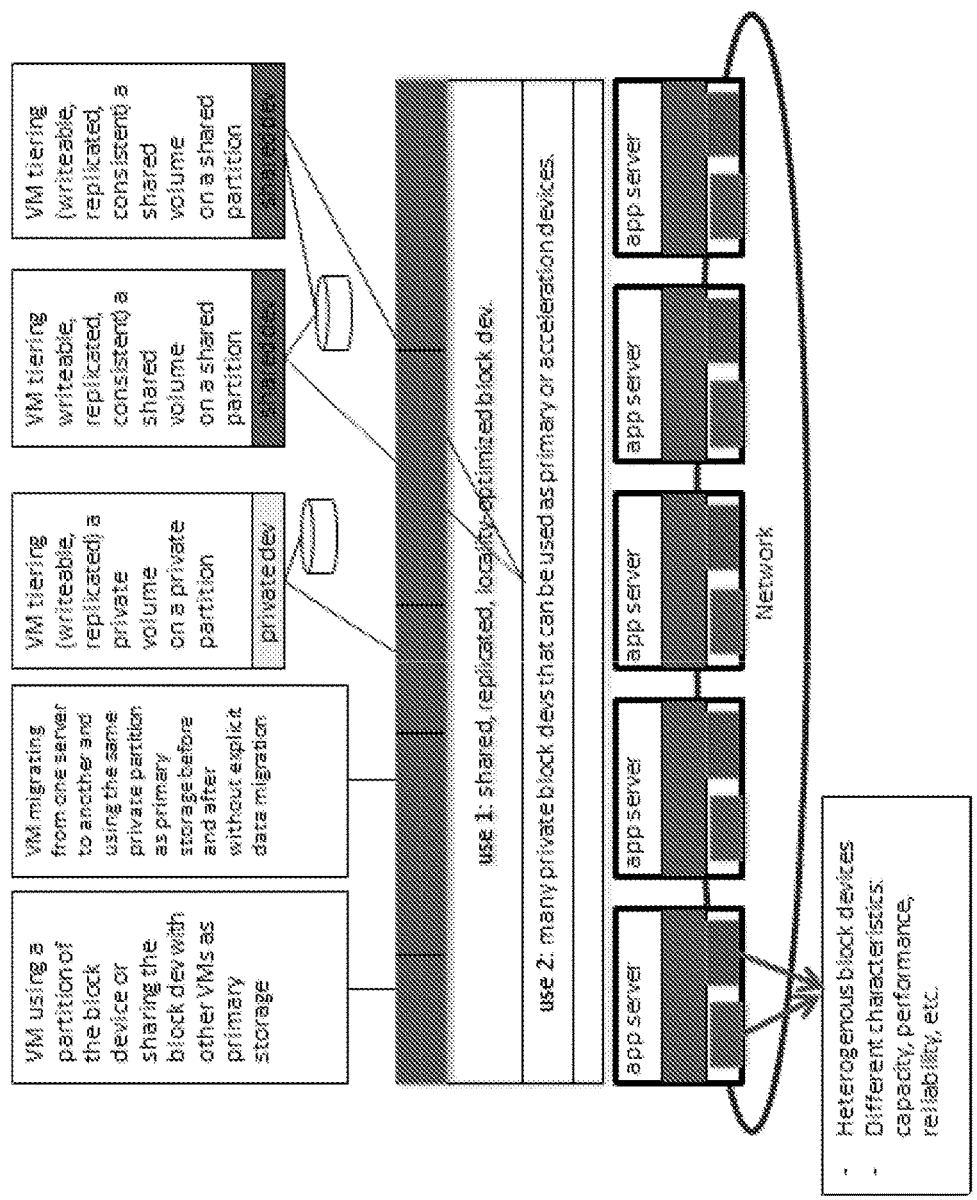
FIG. 2 shows a block diagram illustrating the storage architecture, according to an implementation of TFL.

FIG. 2 shows a block diagram illustrating an aspect of TFL that is capable of providing locality-optimized replicated distributed persistent storage. As shown, TFL may provide application servers with access through a network to shared heterogeneous block devices to allocate thinly-provisioned, private or shared volumes. These shared block devices may have different characteristics, capacity, performance, and reliability, but through TFL, the application servers will be able to use these heterogeneous devices in various ways. For example, a virtual machine may use a partition of the block device or share the block device with other virtual machines (using, for example, Oracle Cluster File System (OCFS)) as primary storage. A virtual machine may migrate from one application server to another using the same private partition as primary storage before and after the migration without explicit data migration. A virtual machine might use the TFL for tiering (writable, replicated) a private volume on a private partition, or for tiering (writeable, replicated, consistent) a shared volume on a shared partition. The block devices can be used as primary or acceleration devices. When used as acceleration devices, the block devices allow for safe writes because they are replicated.

In one exemplary embodiment, TFL may be implemented in Linux as a block driver and two user-space processes, but other implementations may be possible. In one embodiment, TFL may be configured to support data-discovery mechanisms and policy-based data movement. In another embodiment, TFL may define policies to place or move data and metadata in an uncoordinated and de-centralized manner. In another embodiment, TFL may allow a user such as an administrator to add or remove volumes from any volume in the system. In one embodiment, extent metadata may be protected by local, server-level locks to ensure proper access by the kernel threads used by TFL in the application and network I/O path. TFL may also be configured to use per-volume configurable data replication to ensure reliability and availability during failures and may be configured to tolerate node failures and partitions in a single scheme without requiring coordination among nodes.

To achieve these ends, TFL includes the following elements:

Metadata: A new way for organizing and maintaining metadata that binds the location of metadata with the location of data replicas, allows arbitrary placement of both to any node in the system, and reduces or eliminates network accesses for metadata when/after data is locally placed in a node.

Storage targets: A new concept of "storage targets" that are combined in a network to create shared data volumes over shared storage devices, links, and nodes/servers.

Distributed snapshots: A new mechanism for creating distributed snapshots and avoiding network accesses for reads when data is locally available.

Distributed policy: A distributed policy and data migration mechanism, where each migration operation is handled by the node that has the data, avoiding the need for both centralized decisions and explicit coordination.

Consistency: A new approach to consistency that allows reads and writes to proceed in the common path without requiring synchronization.

Failures: A practical approach to global failures and network partitions that uses only individual (local) node decisions without global coordination.

Each of these elements will be described in more detail below.

Metadata:

TFL includes a new way of organizing and maintaining metadata. Typical storage systems offer file, block, or object abstractions. To implement a globally visible address space on top of any of these abstractions, distributed storage systems require some form of metadata in the form of a directory that is able to identify the location of an object in the global shared address space. For instance, in a system that provides block storage, the directory conceptually performs a lookup for the logical block number and returns the physical location of the block. Such directories also include other information, e.g., about replicas, as well as other types of properties for the storage items (blocks, files, objects, etc.). The directory is typically visible from all nodes and can serve multiple requests at the same time. In addition, in scalable systems, given the size of the underlying storage space, the directory can be broken down into multiple pieces and can be distributed to different nodes. This distribution of the directory allows for scaling both the size of the directory as well as the access rate to the directory.

In one embodiment, TFL implements a storage system where the directory metadata is configured to float around data nodes, and not be assigned to specific directory nodes in a pre-specified manner. This design allows any data node to eventually host and access any portion of the data without the need to query other nodes in the network about the location of data. Data nodes may maintain precise metadata for the data they store locally but do not require any information for data stored in other nodes of the system. For data that are not local, nodes may be not obliged to maintain any information, although they can, as an optimization to the base system.

In the TFL, metadata may be kept in memory and persisted when necessary. In one exemplary embodiment, metadata modifications occur during management operations (migration, reconstruction, thin-provisioned allocations) but not during regular I/O read, write operations (local or remote). In such an embodiment, modified metadata is written on the device only after management operations.

To reduce metadata size, TFL may organize I/O blocks in extents (contiguous blocks). In one embodiment of TFL, metadata information may be maintained per extent, so that management operations (migration, reconstruction, thin provisioning) occur at extent granularity, whereas I/O operations (both reads and writes) occur at block granularity. In one exemplary embodiment, the block I/O size may be 4 KBytes and extent I/O size may be configured with typical values in the range of 64K-1 M. Thin provisioning in particular may occur at multiples of extent size, for example, at 16 MBytes.

TFL also provides unique ways of handling I/O operations. In one embodiment of TFL, when an I/O request arrives from a locally running application, the node checks to see if the data is local or not, examining the available metadata. If the data is local, then the data node uses the metadata to serve the I/O request, potentially performing remote data operations as well, e.g. if the operation is a write to a replicated data block. If the data required by the I/O request is not local then the system finds the location of the data by inquiring of other nodes that have metadata for this data item.

In one exemplary embodiment, TFL may use a discovery operation on the nodes that participate to the volume being accessed. One way to implement discovery is with individual network messages to all nodes participating in a volume. For example, this discovery operation may return the actual location(s) of the requested data and its metadata. The local node can then complete the I/O request. In one exemplary embodiment, the local node may also maintain non-committing information about the location of this data item for future use. Each data node may serve remote requests from other data nodes. In one embodiment, TFL may perform extensive movement of data for optimization purposes during operation, without significantly disrupting regular I/Os. During placement optimization, data and associated metadata may move to new locations based on performance, cost, or any other suitable metric.

For read operations, if the data is available locally, TFL may serve the read without network operations for metadata or data. In one exemplary embodiment, if the data is not available locally, TFL discovers the K replicas (where K represents the number of replicas found) for this block and then reads data from one of the K replicas. TFL may also be configured to migrate data after a read and/or maintain replica information as a hint (precise metadata is maintained only for data items that have a local replica) for subsequent operations.

In one exemplary embodiment, for write operations, if the data is available locally, then TFL knows where the K replicas are located (from local metadata) and issues the write to all replicas. TFL can complete the user write after all replicas have been written on the devices, after only the local replica has been written, or after the replicas have been received by the remote nodes, but not written to the respective devices yet. When the block is not available locally, TFL may discover the K replicas, similar to read operations, and then proceeds with updating all replicas.

Figure 3:
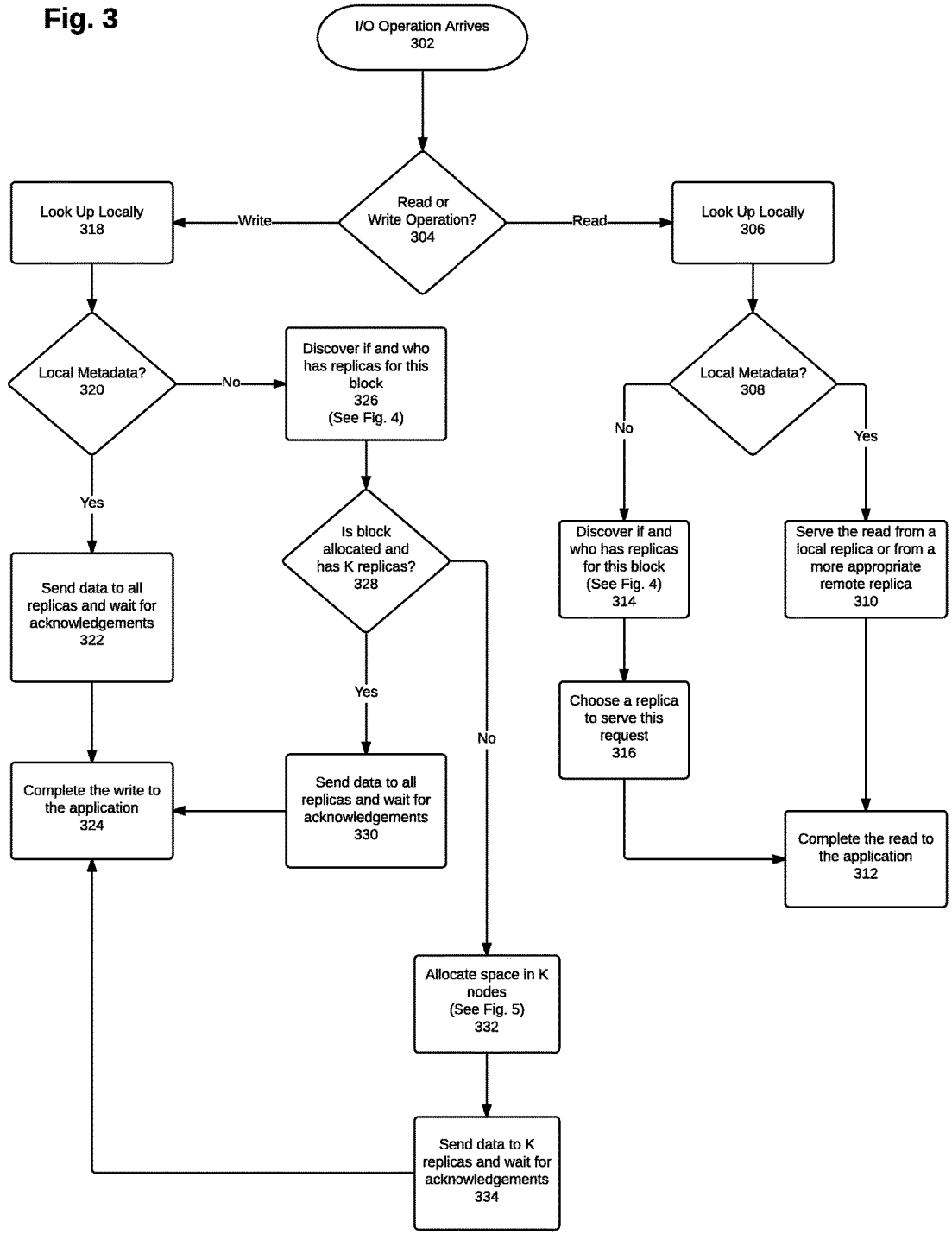
FIG. 3 shows an exemplary process flow for metadata and handling of I/O operations in TFL.

FIG. 3 illustrates an exemplary process flow for handling metadata and I/O operations by TFL. The process is initiated when a serve I/O operation is issued from an application to a given volume for a given block. At 302 the I/O operation arrives for the block. TFL then determines at 304 if the I/O operation is a read operation or a write operation. If the operation is a read operation, the process continues to 306, where TFL looks up locally to determine whether there is information about this block. In particular, at 308, TFL determines whether local metadata exists. If local metadata does exist, TFL determines the most efficient way to serve the read at 310, either from a local replica or from a faster remote replica. Once that determination has been made, TFL then completes the read to the application at 312. If, at 308, TFL determines that there is no local metadata, the process moves on to 314, where TFL discovers if and who has replicas for the requested block. Additional information on this discovery process is included below with reference to FIG. 4. If TFL determines that replicas exist, it will then determine which replica should serve the request at 316, and then complete the read to the application at 312.

If at 304, TFL determines that the operation is write operation, the process continues to 318, where TFL looks up locally to determine whether there is information about this block. In particular, at 320, TFL determines whether local metadata exists. If local metadata does exist, the write is an update, meaning it is not a first write. When this occurs, at 322 TFL sends data to all replicas and waits for acknowledgements. Once acknowledgements have been received, TFL completes the write to the application at 324. If, at 320, TFL determines that there is no local metadata, the process moves on to 326, where TFL discovers if and who has replicas for the requested block. Again, additional information on this discovery process is included below with reference to FIG. 4. At 328, TFL then determine whether the block has been allocated and if it has K replicas. If the block is allocated and has replicas, at 330 TFL sends data to all replicas and waits for acknowledgements. Once acknowledgements have been received, TFL then completes the write to the application at 324. If TFL determines at 328 that the block has not been allocated, meaning that this is a first write, the process moves on to 332, where TFL allocates space in K nodes. Additional details of the allocation process are described in connection with FIG. 5 below. Once the allocation is complete, TFL moves on to 334 where it sends data to the K replicas and waits for acknowledgement. Once acknowledgement has been received, TFL then completes the write to the application at 324.

Figure 4:
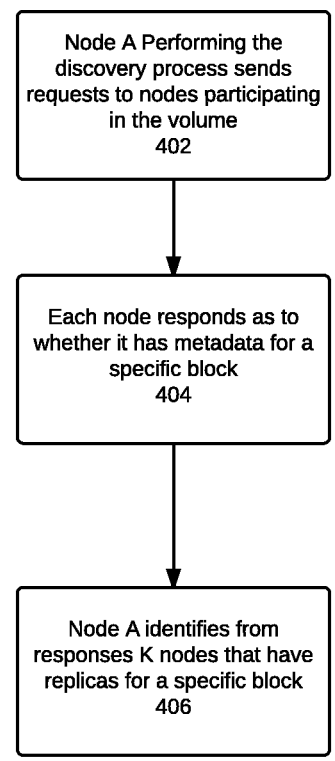
FIG. 4 shows an exemplary process flow for discovering metadata during metadata and handling of I/O operations in TFL.

FIG. 4 shows an exemplary embodiment of a process flow for the discovering whether replicas exist for a block, as shown in 314 and 326 of FIG. 3. At 402, a given node (Node A, for example), performing the discovery process sends requests to nodes participating in the volume. At 404, each node responds as to whether it has metadata for a specific block. At 406, Node A identifies from the responses K nodes that have replicas for the specific block.

Figure 5:
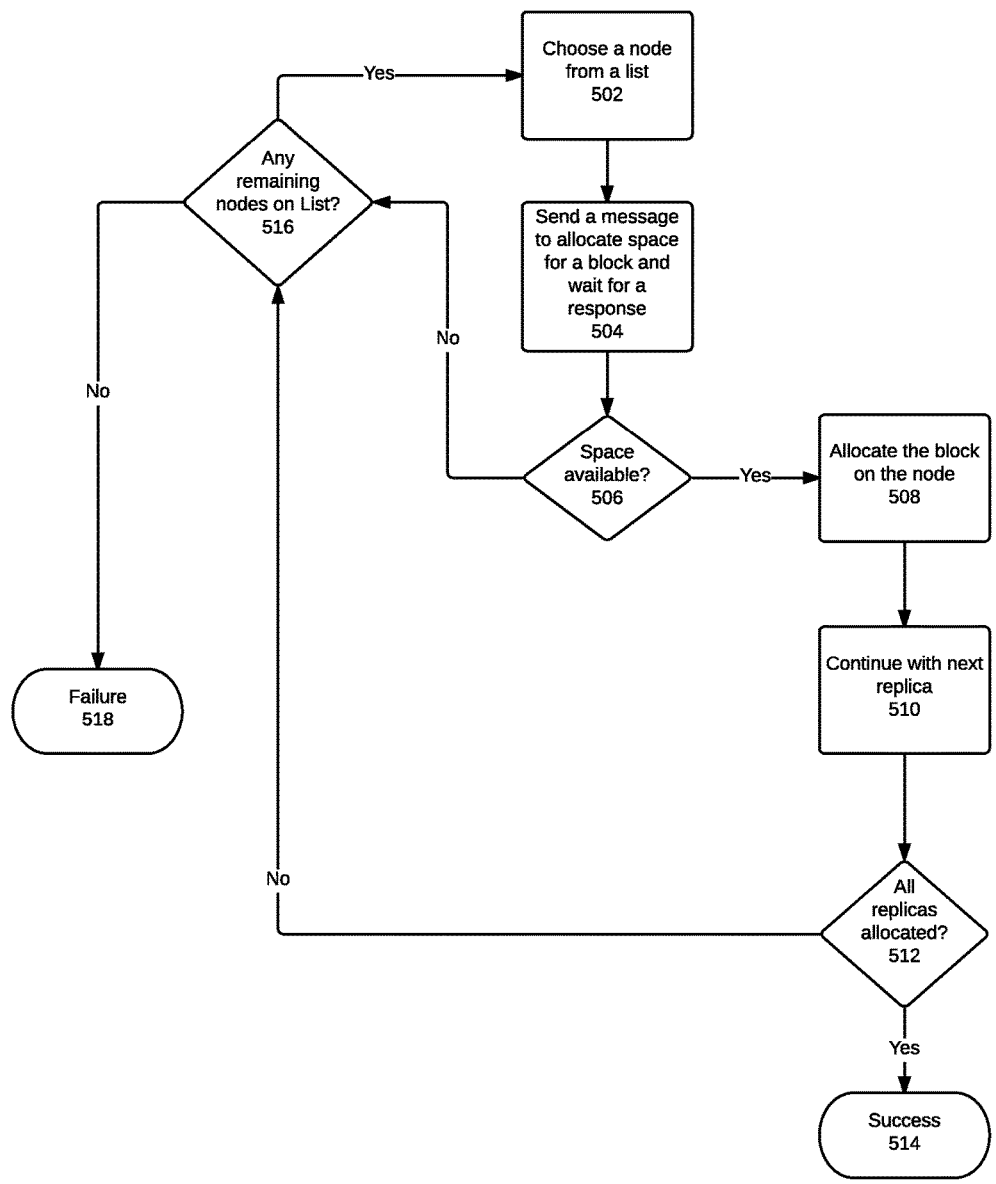
FIG. 5 shows an exemplary process flow for allocating data during metadata and handling of I/O operations in TFL.

FIG. 5 shows an exemplary embodiment of a process flow used by TFL when allocated space in nodes, as shown at 332 of FIG. 3. TFL may use one or more lists of nodes where a block can be allocated. Nodes may be placed in this list in a preferential manner, specified by the system or by a user external to the system. At 502, TFL chooses a node from the list, and at 504 it sends a message to allocate space for a block and then waits for a response. At 506, TFL determines whether there is space available. If there is space available, the process moves on to 508, where TFL allocates the block on the node, and then continues with the next replica at 510. At 512 TFL determines whether all replicates have been allocated. If all replicas have been allocated, then TFL completes the allocation operation successfully. If all replicas have not been allocated, the process reverts to 516 to determine whether there are any remaining nodes on the list. If nodes on the list do not have enough space to allocate all replicas, TFL indicates that the allocation operation was a failure at 518.

TFL may also be configured to handle initial allocation and free-space management on devices. For example, when new writes occur the system needs to allocate space on (local or remote) devices for K replicas and the corresponding metadata. Storage systems may include policies for allocating new data. Example policies for allocating new data, that is, a first write to the storage medium may include: (a) one replica should always be local and the rest round robin, or (b) all replicas should be round robin. In always-local allocation, one replica is always placed on a local device and the rest of the replicas are allocated round-robin covering all devices participating in the volume (but observing the correctness condition to never place two replicas on the same node). In round-robin allocation, all replicas are allocated round robin across all servers. Other polices are possible as well.

In one exemplary embodiment, to allow new data to be allocated locally, a volume manager in TFL ensures that each device used by the volume will have some minimum free space (configurable per device). This proactive approach allows the kernel path to choose where to allocate devices, without having to consider what happens when a device does not have free space. The volume manager creates free space by migrating replicas when free space drops below a specific threshold for the device.

Therefore, the only case where a volume can run out of space is when all devices have free space below their respective thresholds, in which case the volume is considered to have run out of space and new allocations (thinly provisioned writes) will return an I/O error to the issuing application (device full). The per-device thresholds can be different and are related to the speed of each device and the rate at which it can absorb outstanding I/Os.

Storage Targets:

TFL includes a new concept of "storage targets" that are combined in a network to create shared data volumes over shared storage devices, links, and nodes/servers. In one exemplary embodiment, TFL allows a user (a systems administrator, for example), to add or remove devices to and from any volume in the system.

To support this elasticity, TFL uses the notion of storage targets. Each logical data volume in TFL is a collection of storage targets. A storage target is defined as an association of a set of data blocks with a storage device and a volume. The set of data blocks can grow or shrink, as a dynamic and arbitrary subset of the storage device capacity. A storage target can utilize a number of NICs (Network Interface Controllers) in the storage node. A storage target may act as both a client and a server for the TFL network protocols. A volume comprises of a set of storage targets. I/O requests go through volume access points of various types (iSCSI, SCSI, block, object or other) and are demultiplexed to the storage targets to be served. Storage targets serve I/O requests by inserting them into queues to be processed by the storage target client contexts. Should any additional remote information or operations be necessary, TFL protocol requests may be generated and sent to the other storage targets to be served in their respective server contexts.

In TFL, storage targets enable storage device sharing between many volumes, since many targets of different volumes can co-exist in a storage device. They also allow for network multi-path access to the storage node NICs, for fail-over and performance reasons. The storage target architecture also allows for performance scaling by increasing the number of client/server contexts or the number of targets and utilizing more devices, CPU cores, or memory as a result.

Figure 6:
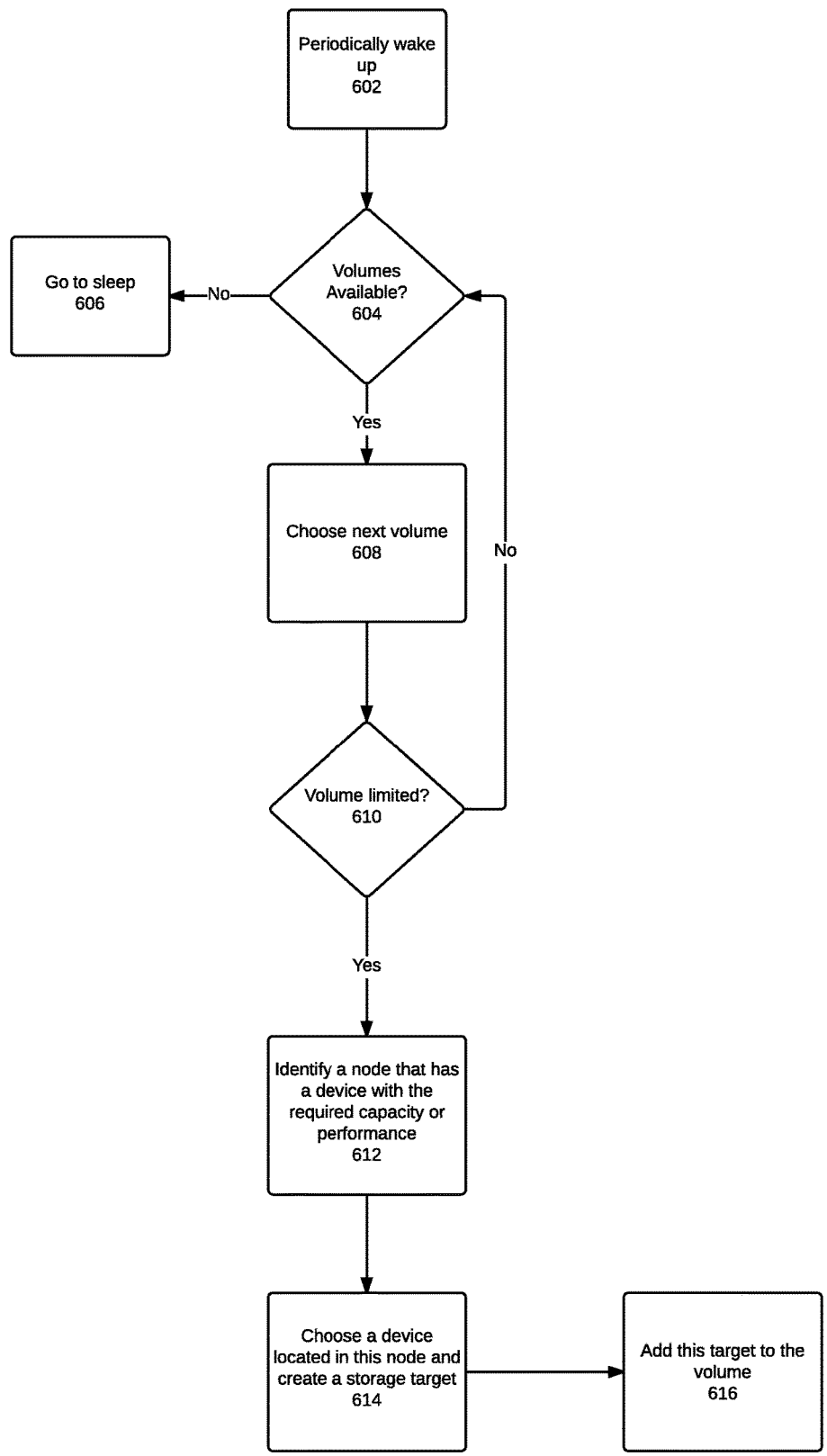
FIG. 6 shows an exemplary process flow for the use of storage targets to change resources allocated to a volume by an external agent in one implementation of TFL.

FIG. 6 is a process flow showing one example of how TFL can use storage targets to change resources allocated to a volume by an external agent. At 602, TFL periodically wakes up 602 to query the network at 604 to determine whether there are volumes available. If there are not volumes available, TFL may go to sleep at 606. If there are volumes available, TFL chooses the next available volume at 608, and determines whether that volume is limited in any way, for example, by device capacity or performance, network performance, or CPU performance. If the volume is not limited, the process returns to 604 to determine whether other volumes are available. If at 610, TFL determines that the volume is limited, the process continues to 612 where TFL identifies a node that has a device with the required capacity or performance, and then at 613 chooses a device located in this node (which can be used by other volumes as well) and creates a storage target. At 616, TFL adds the newly created storage target to the volume.

Distributed Snapshots:

TFL supports fast distributed snapshots. A snapshot can be thought of as a photo of a state of a virtual machine. A snapshot is a metadata mapping that points to a set of volume blocks that represent the data at the time the snapshot was created. By contrast, a clone is a complete copy of the data that has been created, for example, a copy of a virtual machine.

In one exemplary embodiment, snapshot creation in TFL has constant time complexity with respect to volume space, since TFL does not need to scan the volume data. TFL supports both read-only snapshots and writeable clones. In one exemplary embodiment, every new write request from a writeable clone access point triggers a remap-on-write mechanism that allocates a new data extent on a target. If the I/O request is smaller than the data extent, the contents of the immediate ancestor extent may be read, locally or remotely, to fill the gaps of the descendant extent.

Using TFL, Snapshots are also fast due to the fact that when a target is queried for data, it understands if it owns the latest version of the data with respect to the snapshot/clone access point that generated the request, without having to use any remote information via the network. That is, if the target owns the up-to-date data for a specific snapshot, then it already knows about the up-to-date data. This allows policy mechanisms in TFL to optimize performance by placing the up-to-date data near the application.

In one exemplary embodiment, TFL achieves the above by storing an ancestry tree for each data extent in the corresponding persistent metadata segment, and comparing that ancestry tree to the full ancestry tree that describes the clone or snapshot history. This means that there could be as many different ancestry trees as there are data extents, given a suitable application I/O pattern. In one exemplary embodiment, the persistent metadata are only updated when they are changed, that is for every first write request in a writeable clone. Subsequent write requests only affect the data and not the metadata segment for the snapshots.

This mechanism for storing snapshot metadata allows TFL to be fully recoverable in the event of power loss while supporting distributed snapshots. Because the persistent metadata can always be associated with their corresponding data, and metadata updates only happen during the remap-on-write phase caused by outstanding I/O write requests, there is no risk of losing metadata when a failure occurs during reads or writes.

Figure 7:
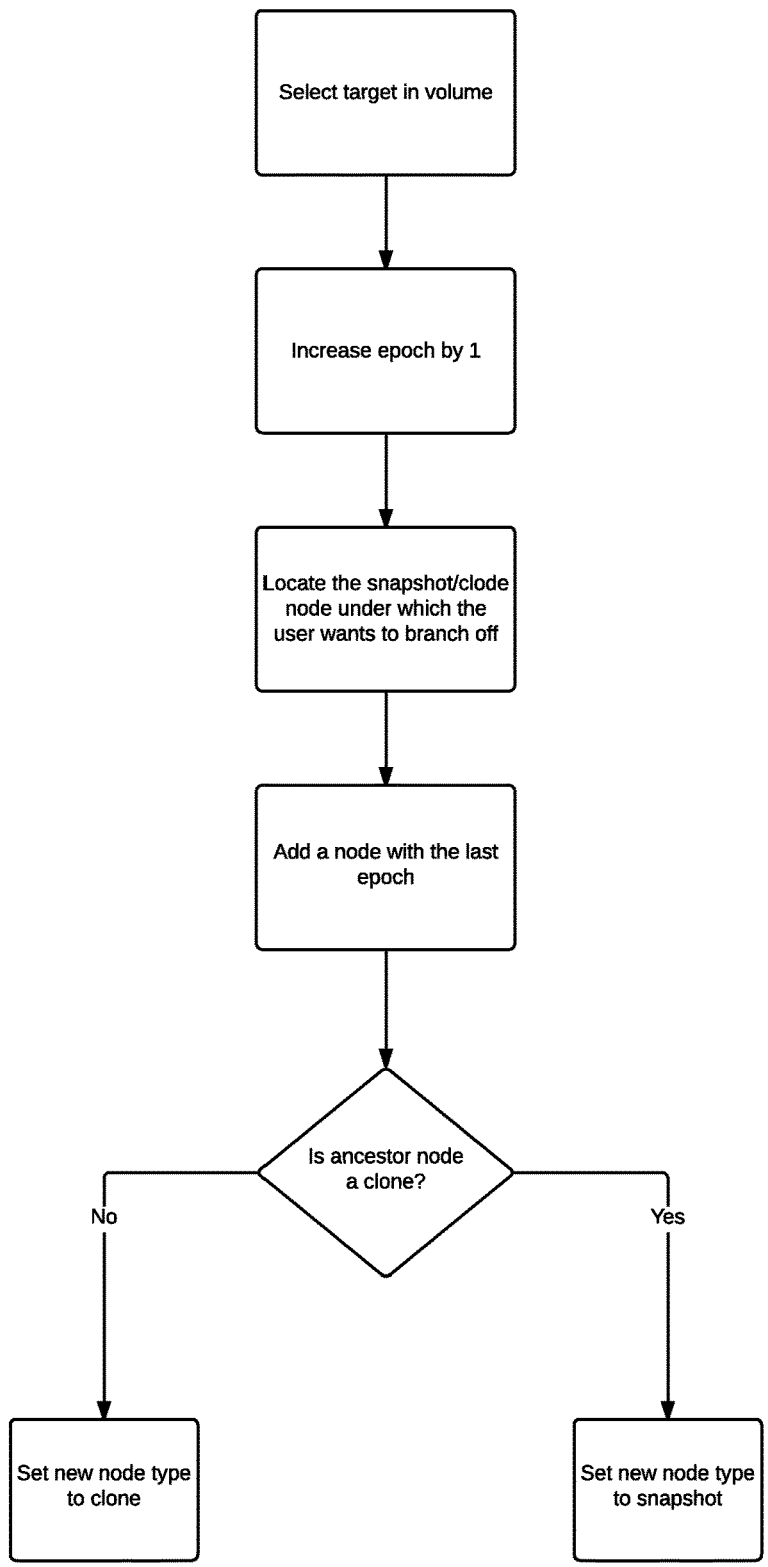
FIG. 7 shows an exemplary process flow for creating a snapshot or clone in one implementation of TFL.
Figure 8:
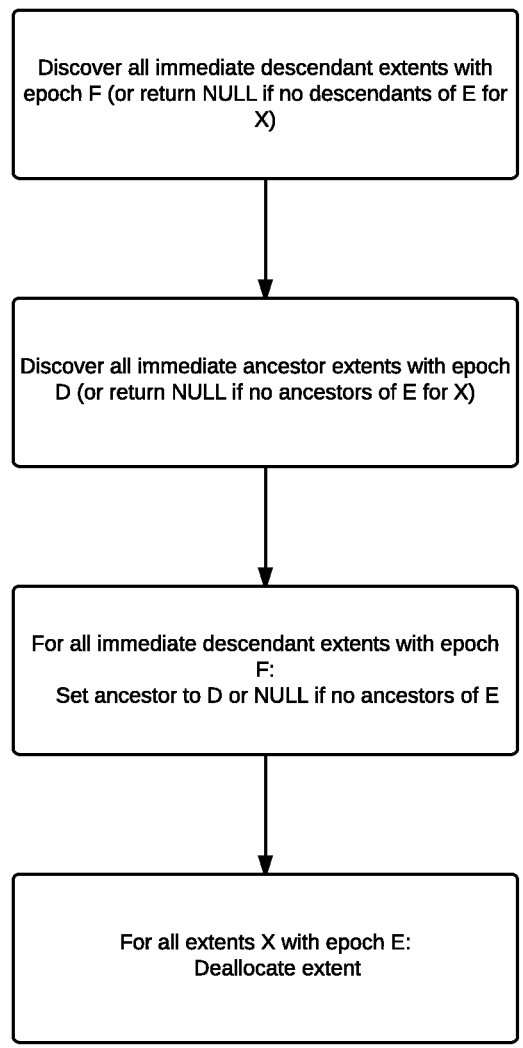
FIG. 8 shows an exemplary process flow for merging extents in one implementation of TFL.
Figure 9:
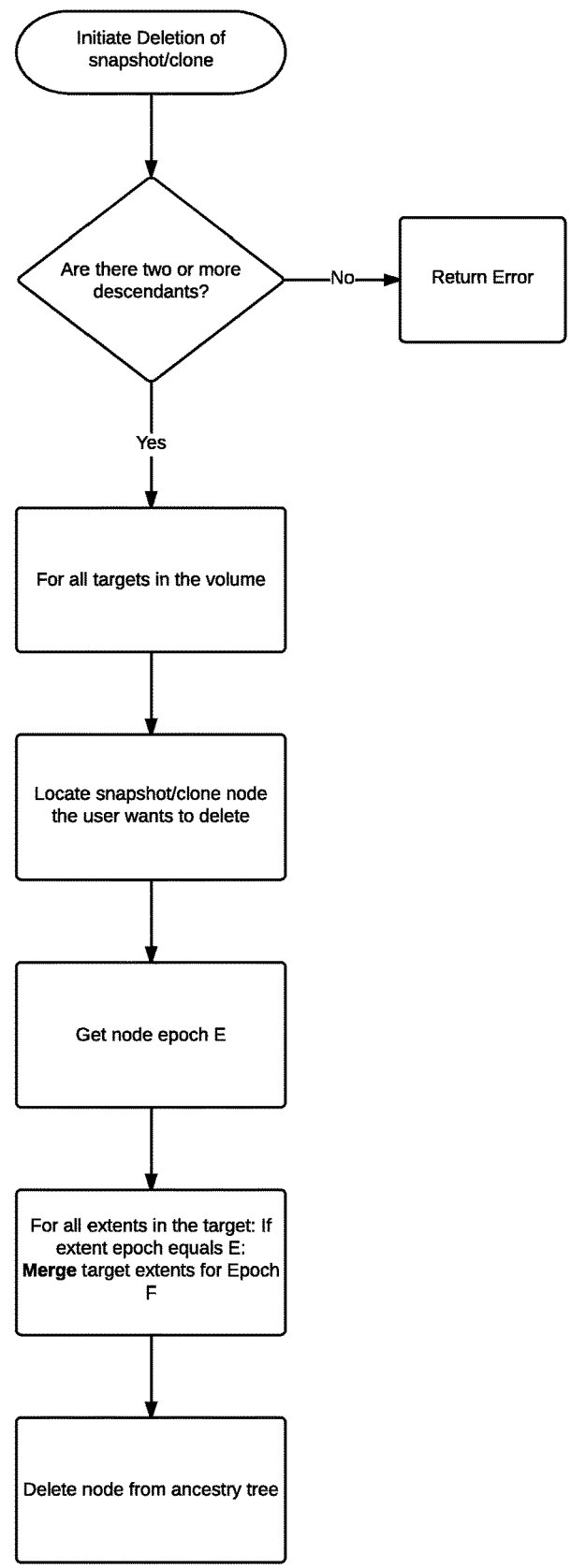
FIG. 9 shows an exemplary process flow for deleting a snapshot or clone in one implementation of TFL.
Figure 10:
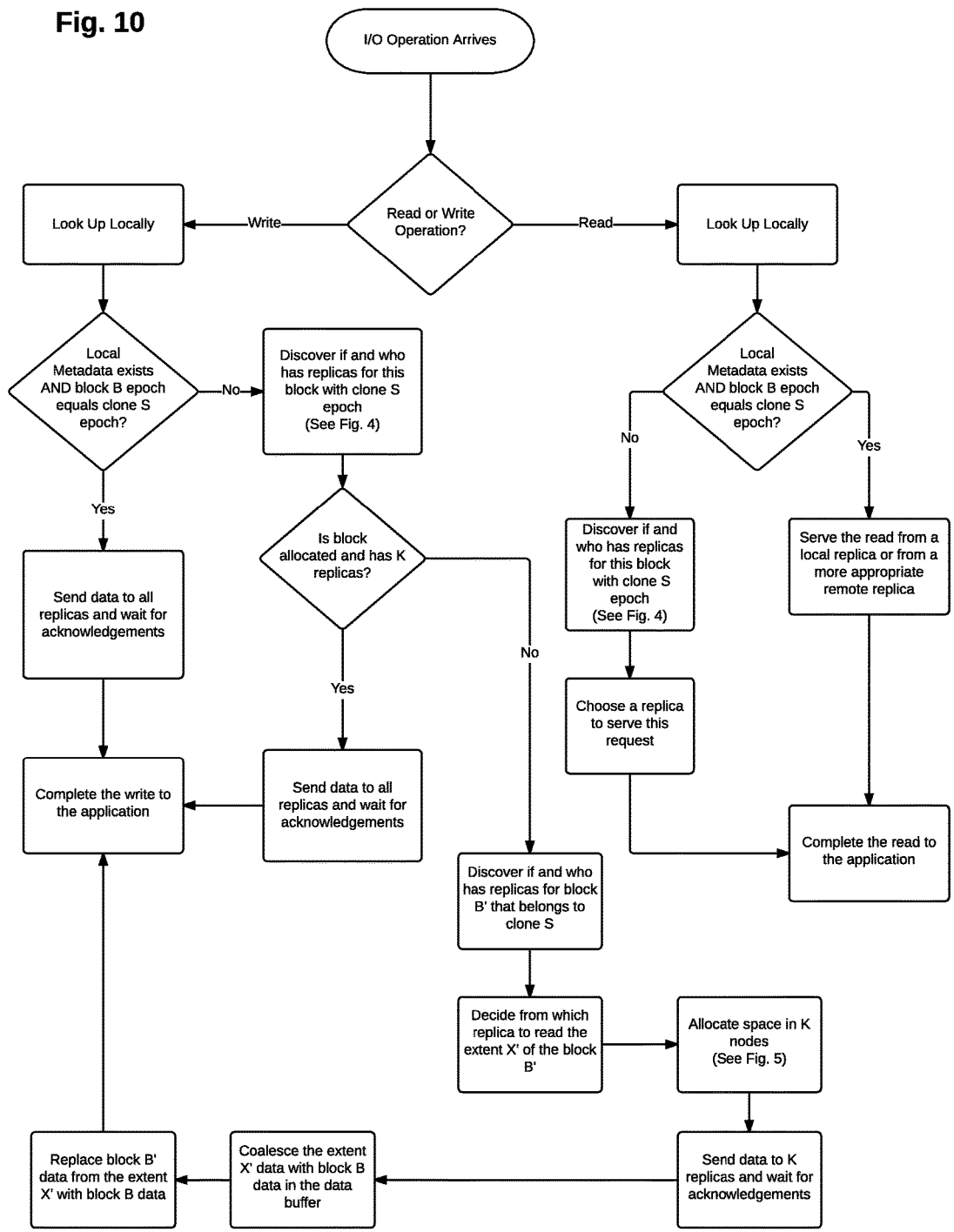
FIG. 10 shows an exemplary process flow for handling a read/write request to a clone in one implementation of TFL.
Figure 11:
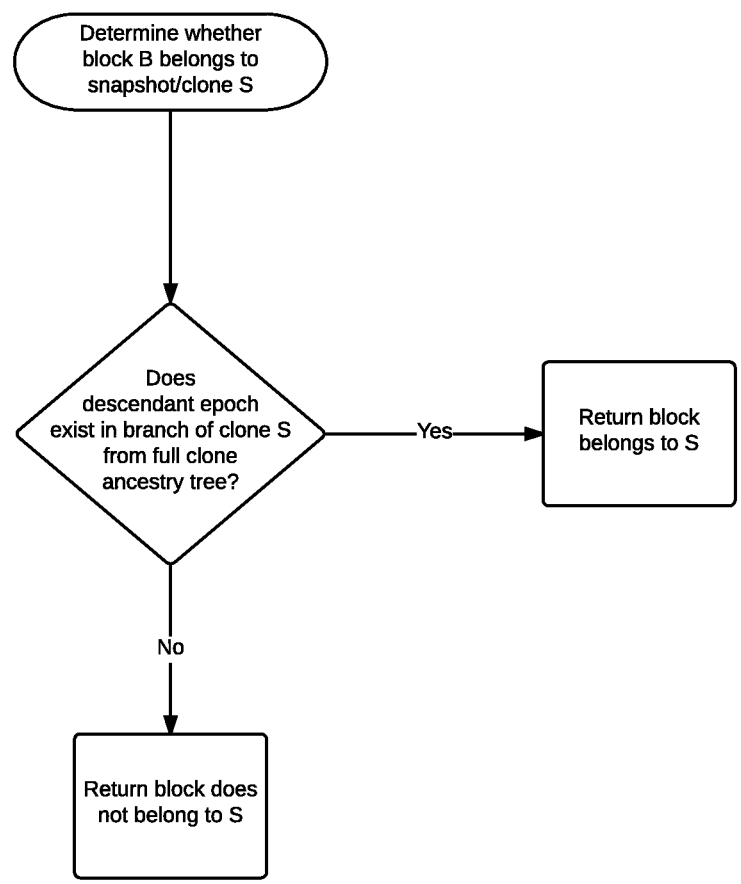
FIG. 11 shows an exemplary process flow for determining whether a block belongs to a snapshot or clone in one implementation of TFL.

FIGS. 7 through 11 show various exemplary process flows related to distributed snapshots/clones within TFL. FIG. 7 shows an exemplary process flow for creating a snapshot or clone in one implementation of TFL; FIG. 8 shows an exemplary process flow for merging extents in one implementation of TFL; FIG. 9 shows an exemplary process flow for deleting a snapshot or clone in one implementation of TFL; FIG. 10 shows an exemplary process flow for handling a read/write request to a clone in one implementation of TFL; and FIG. 11 shows an exemplary process flow for determining whether a block belongs to a snapshot or clone in one implementation of TFL.

Distributed Policy:

In one exemplary embodiment, the organization of metadata in TFL allows data to migrate on demand anywhere in the system while maintaining local access to data without the need for network operations by migrating the associated metadata as well.

When TFL notices (e.g. based on a user-defined policy) the need to migrate data, it uses a coordination protocol across the nodes involved to allocate space and move data and the associated metadata of one of the replicas to a new location, while updating the rest of the replicas. Migration operations can be initiated by different entities (users, applications, administrators), either in user- or kernel-space, and they can be served concurrently with other migration operations as well as regular read or write I/O operations. Decisions on which replica to move and where to move the replica can be taken in different ways and by different entities, e.g. user, systems, administrator.

In one exemplary embodiment, TFL provides a mechanism to migrate data (within volumes and independently for each volume) in an uncoordinated manner, without centralized decisions, as follows: (1) Storage devices are distributed across nodes in a distributed system. (2) Each node gathers performance statistics about other nodes that are not affected by the relative location of the nodes in the network, e.g., CPU and device utilization. (3) Each node gathers and maintains statistics about the I/O requests it serves locally (from applications—application path) and remotely (from other nodes in the system—server path). (4) Each node observes the data that are stored locally and determines metrics about the data, e.g. "usefulness" and "hotness." (5) Each node takes decision on where to move data that are stored on its own devices to devices in other nodes in the storage system. These decisions are taken independently by each node and refer only to data stored on local devices. (6) The decisions taken by each node on how to move data can be based on various policies, such on required latency of I/O, required number of Input/Output operations per second (IOPS), energy efficiency, or any other suitable metric, either of a specific application or of the system as a whole. In one embodiment, different applications will require different policies that will be implemented on top of the provided framework.

Using TFL, policy measurements may be performed at user space. The volume manager may observe application performance for applications using its volume and issue requests to the kernel for moving specific block replicas from source to destination nodes. Blocks may be moved (migrated) at extent-granularity.

To assess the blocks that should migrate and to avoid using additional metadata in user space, the volume manager may use least recently used (LRU) metadata (or similar metadata) that is maintained by the kernel. This provides the volume manager with access to the access pattern of the volume data that is placed on local devices, but not on remote drives. This mechanism relies on distribution to collectively decide on the placement of data for a volume as follows. Each device (a server, for example) participating in a volume, maintains a list of the devices in the volume, ranked by performance (latency, IOPS, throughput), as seen by this server (due to asymmetry in the network, not all servers/devices have the same view of this ranking). Then, each server/device that participates in the volume decides independently how to move data.

An example of rules on how data can be moved is as follows:

(1) If the average read or write time, as measured, during the monitoring phase exceeds (i.e., is outside the desired) the volume SLA (Service Level Agreement), then the system promotes one or more replicas for data items that are actively being accessed (during the last interval), e.g. to faster devices.

(2) If the average read or write IOPS are outside the desired range for the volume SLA and one of the volume devices has high utilization, then move one or more replicas for active data items from high to lower utilization devices.

(3) If a block is not actively used, then demote one or more of its replicas to slower devices within the volume.

These rules may be applied, e.g. to the blocks at the head/tail of the LRU. Note that the LRU may need to also include information for network accesses within TFL and not only access from the application I/O path.

Figure 12:
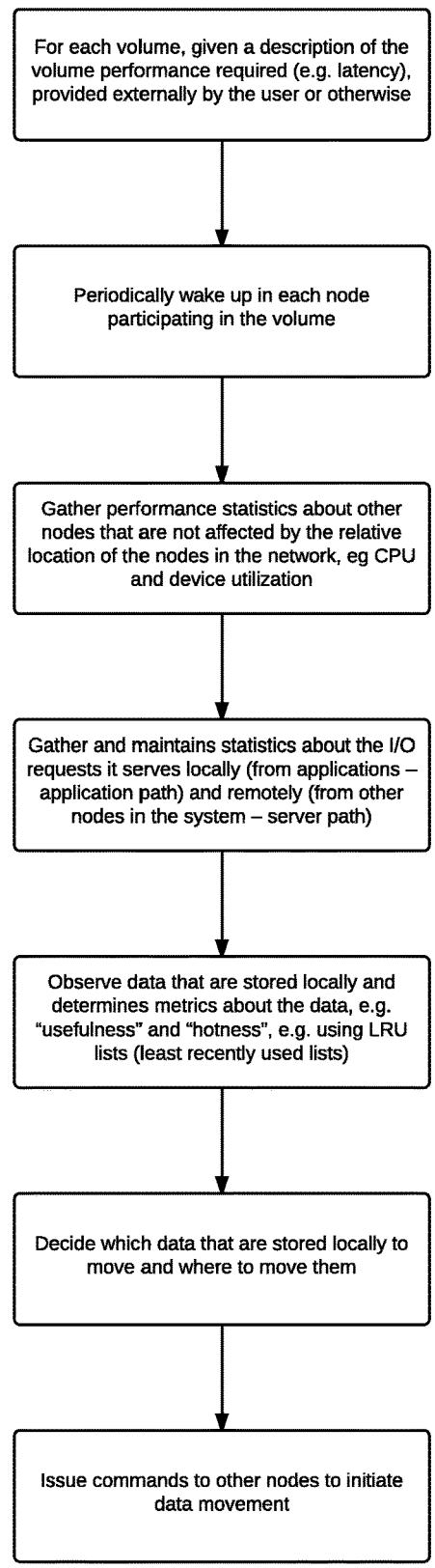
FIG. 12 shows an exemplary process flow for migrating data according to a distributed policy in one implementation of TFL.

FIG. 12 shows an exemplary process flow for migrating data according to a distributed policy in one implementation of TFL.

Consistency:

TFL provides an approach to consistency that allows reads and writes to proceed in the common path without requiring synchronization. A typical problem when employing replication in a storage system is handling concurrent writes to the same block in a manner that allows all replicas of the block to have a correct value. Typical solutions involve locking, which ensures that updates to all replicas are ordered in the same manner.

In one exemplary embodiment, TFL uses an approach that relaxes ordering constraints and allows reads and writes to proceed without the need for locks in the common case, as follows: Instead of ensuring that a single read/write proceed for each block, TFL allows all reads and writes to proceed without locks. Then, it detects if any of the concurrent operations were conflicting (at least one of them is a write and they are performed on the same data item). If there is no conflict, TFL continues operation. If there is a conflict, then before completing conflicting operations, TFL reconciles any inconsistencies that may have been created, by using an explicit protocol among all nodes involved. As a result, TFL may relax consistency for concurrent conflicting operations, for the duration of the write operations. When the last write operation completes, the system ensures that all replicas have consistent values and that subsequent reads will return the latest value.

In one exemplary embodiment, TFL approaches handling concurrent accesses (read, write) from different nodes that host replicas locally as follows: (1) TFL allows writes and reads to replicas to progress independently for each replica. (2) TFL detects conflicting writes that may leave the replicas in an inconsistent state. Detection relies on a mechanism where each I/O write request has to reach all replicas and the issuer has to receive an acknowledgement from each replica. The acknowledgement is accompanied by a write tag (number) that has to match among all replicas. If this write tag differs between two replicas, then there is a concurrent write operation that may leave replicas in an inconsistent state. (3) Once a potential conflict has been detected by a writer that has issued a write I/O, this node initiates a protocol that involves the replicas and brings them in consistent state. Multiple such initiations can happen concurrently and are resolved by TFL. (4) When the potential write conflict has been rectified the system returns to normal operation, accepting read/write I/Os to this block. (5) Reads proceed in an uncoordinated manner to all replicas. This means that a read might return a value that was subsequently overwritten by a conflicting write and multiple reads (from the same or different nodes) may return different values and in the wrong chronological order. This however, only occurs when there are conflicting writes concurrently with the reads.

In addition, in one exemplary embodiment, TFL employs network-level locks for ensuring consistency of management operations in the data path. Network locks can be coarse-grain (e.g., a single lock for each volume) or fine-grain (e.g., separate range locks for each address range in each volume), allowing a different degree of outstanding management operations but only one within each range.

Figure 13:
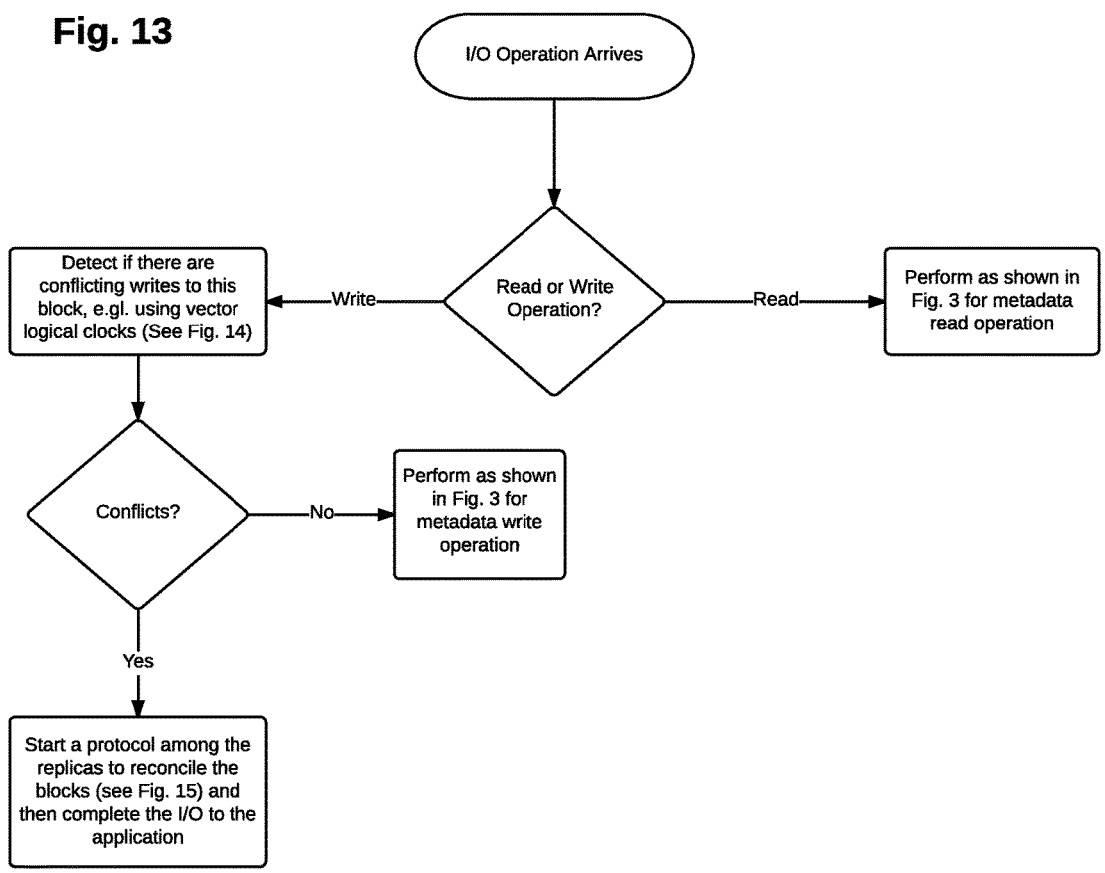
FIG. 13 shows an exemplary process flow for serving of read/write I/O operations in one implementation of TFL.
Figure 14:
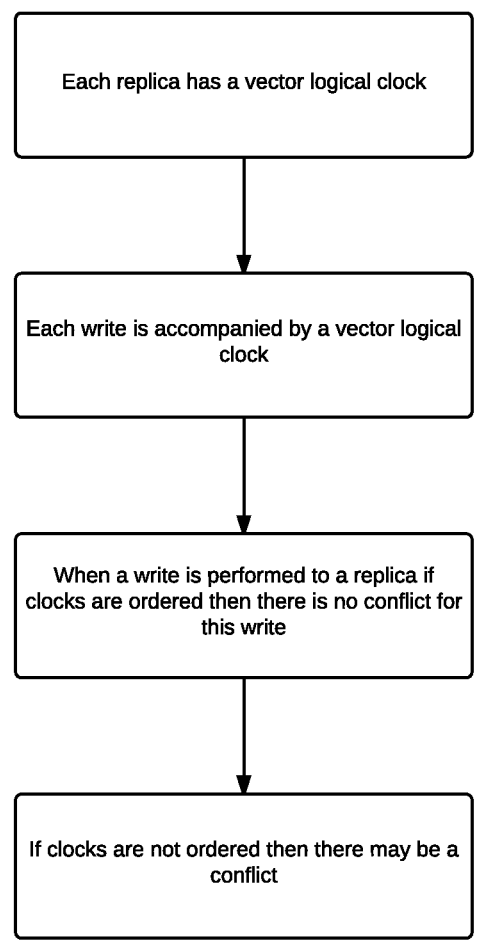
FIG. 14 shows an exemplary process flow for detecting conflicting writes in one implementation of TFL.
Figure 15:
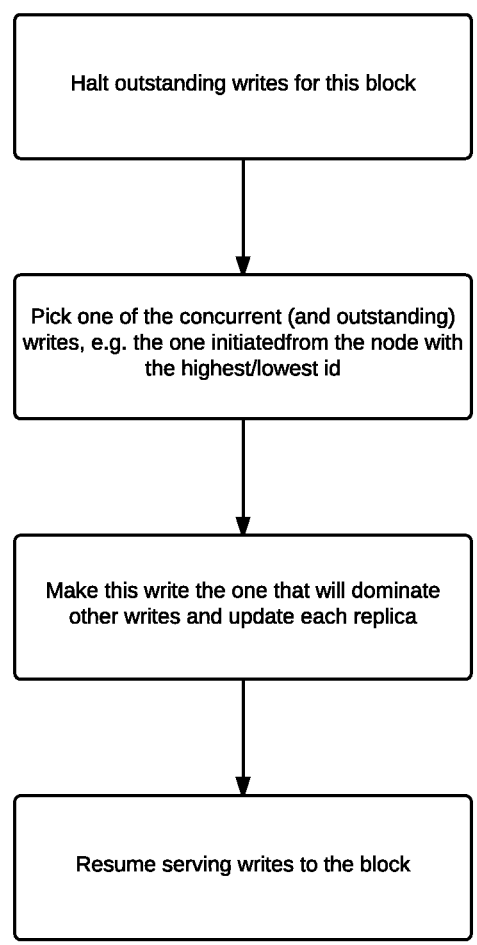
FIG. 15 shows an exemplary process flow for reconciling conflicts in one implementation of TFL.

FIGS. 13 through 15 show various exemplary process flows related to consistency within TFL. FIG. 13 shows an exemplary process flow for serving of read/write I/O operations in one implementation of TFL; FIG. 14 shows an exemplary process flow for detecting conflicting writes in one implementation of TFL; and FIG. 15 shows an exemplary process flow for reconciling conflicts in one implementation of TFL.

Failures:

In one embodiment, TFL implements a practical approach to global failures and network partitions that uses only individual (local) node decisions without global coordination. For example, TFL may use per-volume configurable data replication to ensure reliability and availability during failures. In one exemplary embodiment, TFL deals as follows with different types of failures:

Network failures are masked initially by the use of TCP/IP (Transmission Control Protocol/Internet Protocol) and additional error handling failures protocols, such as session reconnection, built on top of the low-level network protocol, e.g., TCP/IP. Any network failures that is not masked is translated to target failures, for all targets that are visible via the specific network path. Failing targets are removed from the system, without interrupting regular or management operations, up to K target failures. If K targets fail, then the corresponding volumes will shut down and will cease to accept I/O requests from applications.

In one exemplary embodiment, TFL tolerates node failures and partitions in a single scheme without requiring coordination among nodes. For example, each node may make independent decisions as follows (where thresholds, operations, and values can change): (1) Each node periodically pings every other node in the system. For example, node A issues a ping operation and node X is a node receiving the ping operation. (2) If node A receives an acknowledgement, node A proceeds to the next node. (3) If node A does not receive an acknowledgement, then Node A retries until a predetermined criterion is fulfilled. (4) If retries fail, then node A may do one of two things: (a) Declare node X dead (assuming fail-stop failures) or (b) Declare itself (node A) dead (and stop operating in a fail-stop manner). (5) To choose between (a) and (b), node A sends messages to other nodes in the system. If it receives more than T responses it chooses (a) otherwise it chooses (b). T is a threshold that can be set depending on the operation point of the network. (6) If T is set to N/2 (N being the number of nodes) then, upon a network failure, any system partition that is smaller than N/2 will shut itself down, eliminating network partitions and avoiding global coordination.

In this embodiment, the system will keep operating as long as there are more than T nodes available and communicating among themselves.

The process used to allow nodes to recover from full failures also allows nodes to rejoin an existing system, without invalidating all of the data of the nodes.

In one exemplary embodiment of the TFL, metadata is maintained consistent across all K replicas during failures with the use of locks and by ordering related operations.

Data consistency in the presence of failures in TFL may be handled differently. There are two cases: (a) Data consistency when individual failures occur. Outstanding writes to blocks can result in inconsistent value of the block in the different replicas, in case the issuing node for a write is the one that fails. In this case, TFL may employ a redo mechanism, initiated from the non-failing nodes to bring the remaining replicas into a consistent state. (b) Data consistency when a global failure occurs. In this case, when the system restarts, replicas for single block may have inconsistent values. One solution that may be implemented by TFL is to scan all data blocks and compare their contents for inconsistencies. Then, these blocks can either be flagged or repaired. To repair the blocks TFL may choose any of the values of the replicas and make it the current value of the block in all replicas. This will correspond to the outstanding write being or not being effective in all replicas, and both cases are correct. This mitigates the cost of a global scan operation. In one exemplary embodiment, TFL performs this operation in parallel for each volume and each target within a volume, dramatically reducing recovery time. TFL deals with transient failures, device and node failures, and partitions by allowing only the largest partition to operate.

Figure 16:
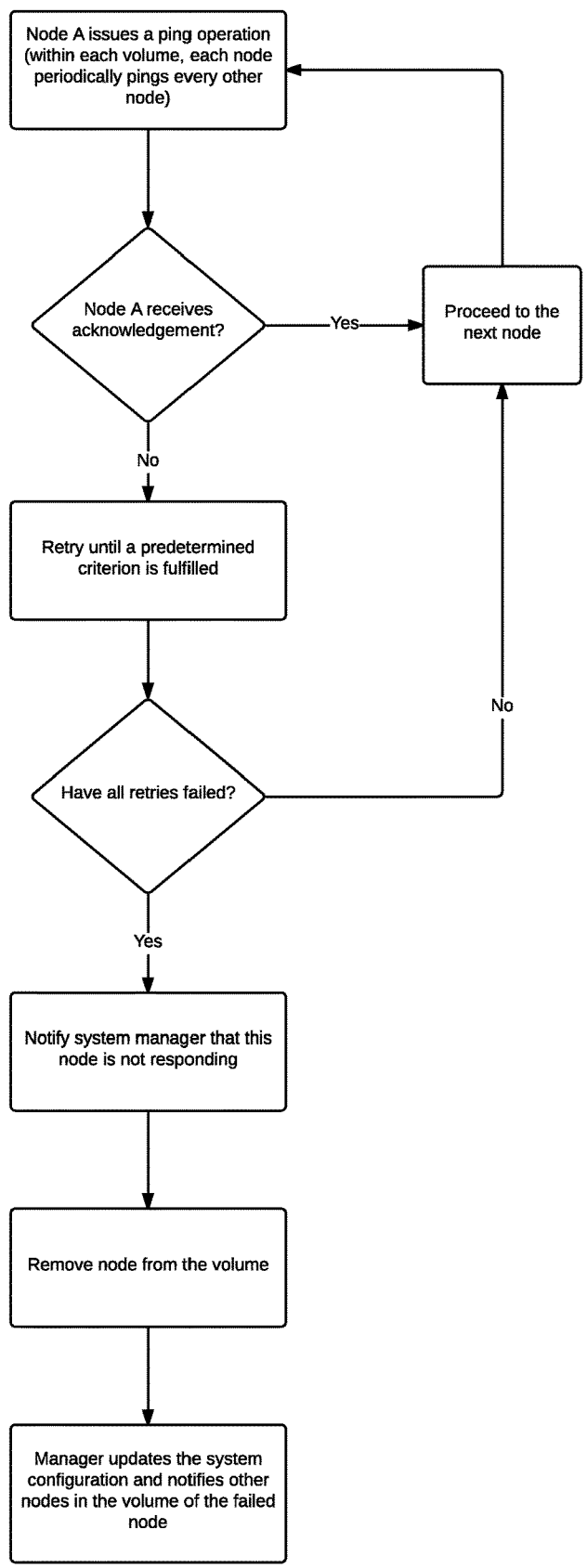
FIG. 16 shows an exemplary process flow for handling node failures in one implementation of TFL.
Figure 17:
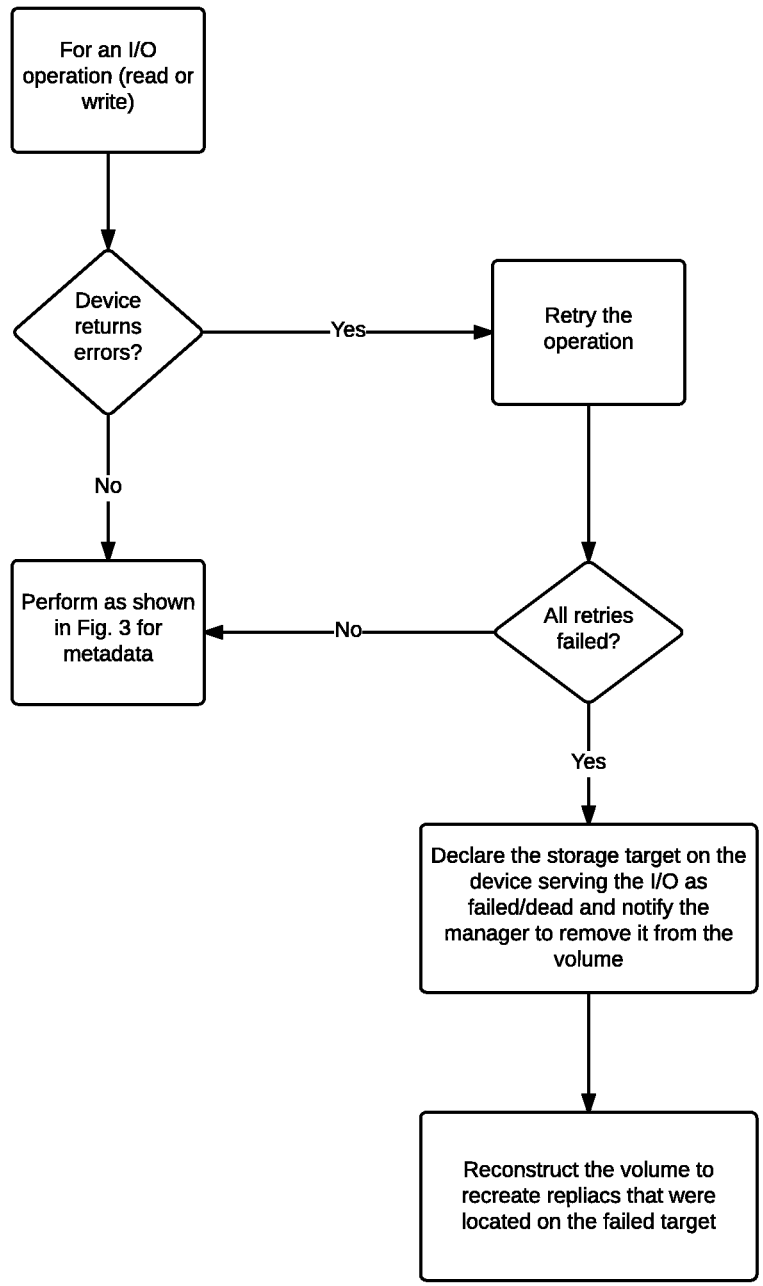
FIG. 17 shows an exemplary process flow for handling device failures in one implementation of TFL.
Figure 18:
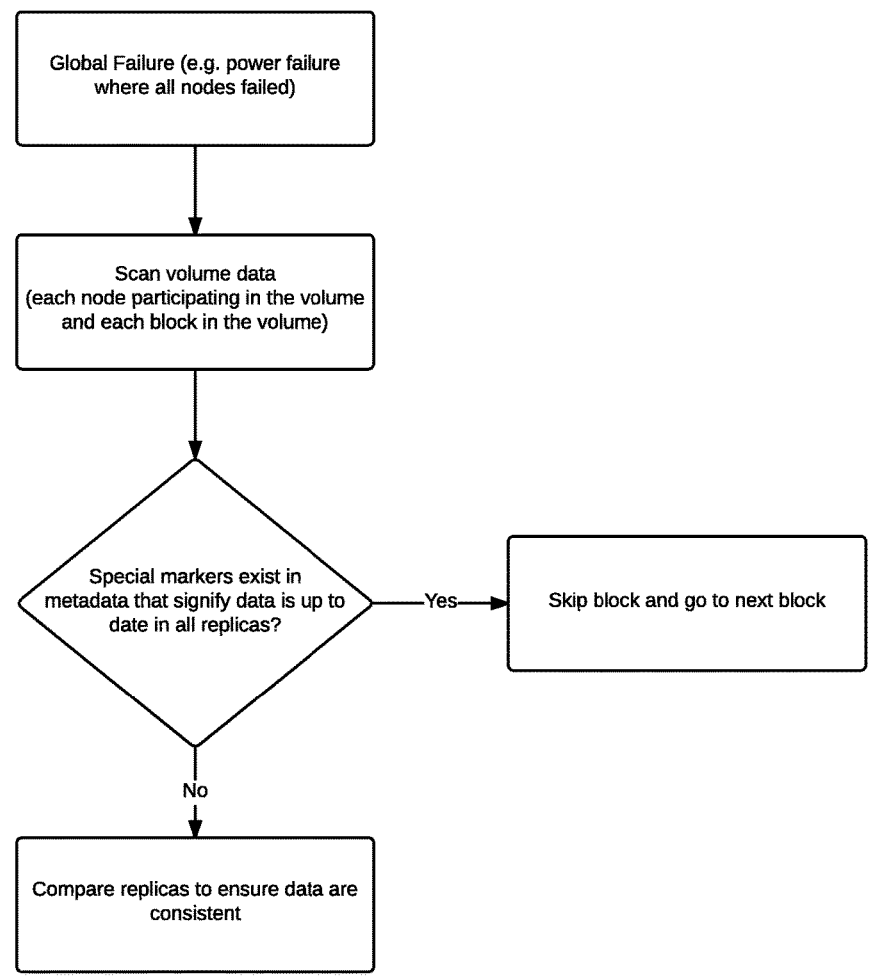
FIG. 18 shows an exemplary process flow for handling global failures in one implementation of TFL.
Figure 19:
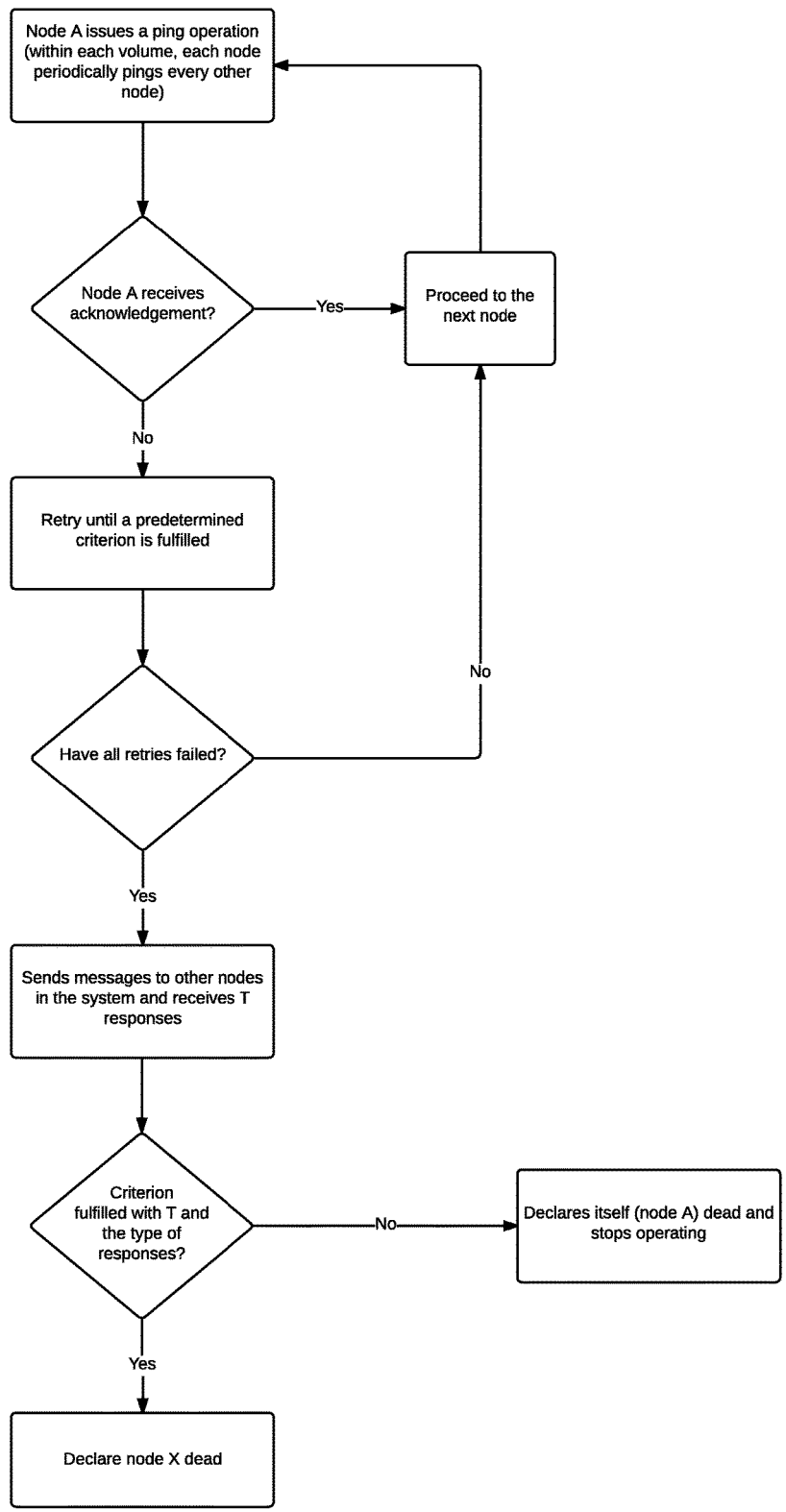
FIG. 19 shows an exemplary process flow for handling partition failures in one implementation of TFL.

FIGS. 16 through 19 show various exemplary process flows related to the handling of failure in TFL. FIG. 16 shows an exemplary process flow for handling node failures in one implementation of TFL; FIG. 17 shows an exemplary process flow for handling device failures in one implementation of TFL; FIG. 18 shows an exemplary process flow for handling global failures in one implementation of TFL; and FIG. 19 shows an exemplary process flow for handling partition failures in one implementation of TFL.

FIG. 20 shows some indicative performance numbers for one implementation of TFL. As shown, in one implementation, TFL achieves about 2.5 M IOPS for random read operations over three nodes and five volumes spanning all nodes, where each volume consists of a private ramdisk in each nodes. In this configuration, after optimizing for placement, most read operations are served locally in each node. Writes are replicated (each volume uses two replicas) and always use the network for at least one of the replicas. With 4K requests network throughput saturates at about 128 outstanding requests (queue depth). At 8K request size, network throughputs saturates at about 4 outstanding requests. For sequential I/O operations behavior is similar since the volumes use ramdisks as the underlying devices.

FIG. 20 shows total I/O operations per second (IOPS) for an exemplary TFL system with three nodes interconnected with 10 GBit/s Ethernet. The top row shows sequential I/O performance (reads on the left and writes on the right), whereas the bottom row shows random I/O performance (reads on the left and writes on the right). For each configuration random/sequential read/write the x-axis shows the number of outstanding I/O operations (queue depth). The exemplary TFL system used to generate this data uses five volumes where traffic is sent concurrently to all volumes. Each volume consists of a ramdisk in each of the nodes, uses replication factor of two, and the has optimized placement of the data prior to performing the measurements. The workload may be generated with FIO (Flexible I/O tester), or any other suitable tool.

TFL Controller

Figure 21:
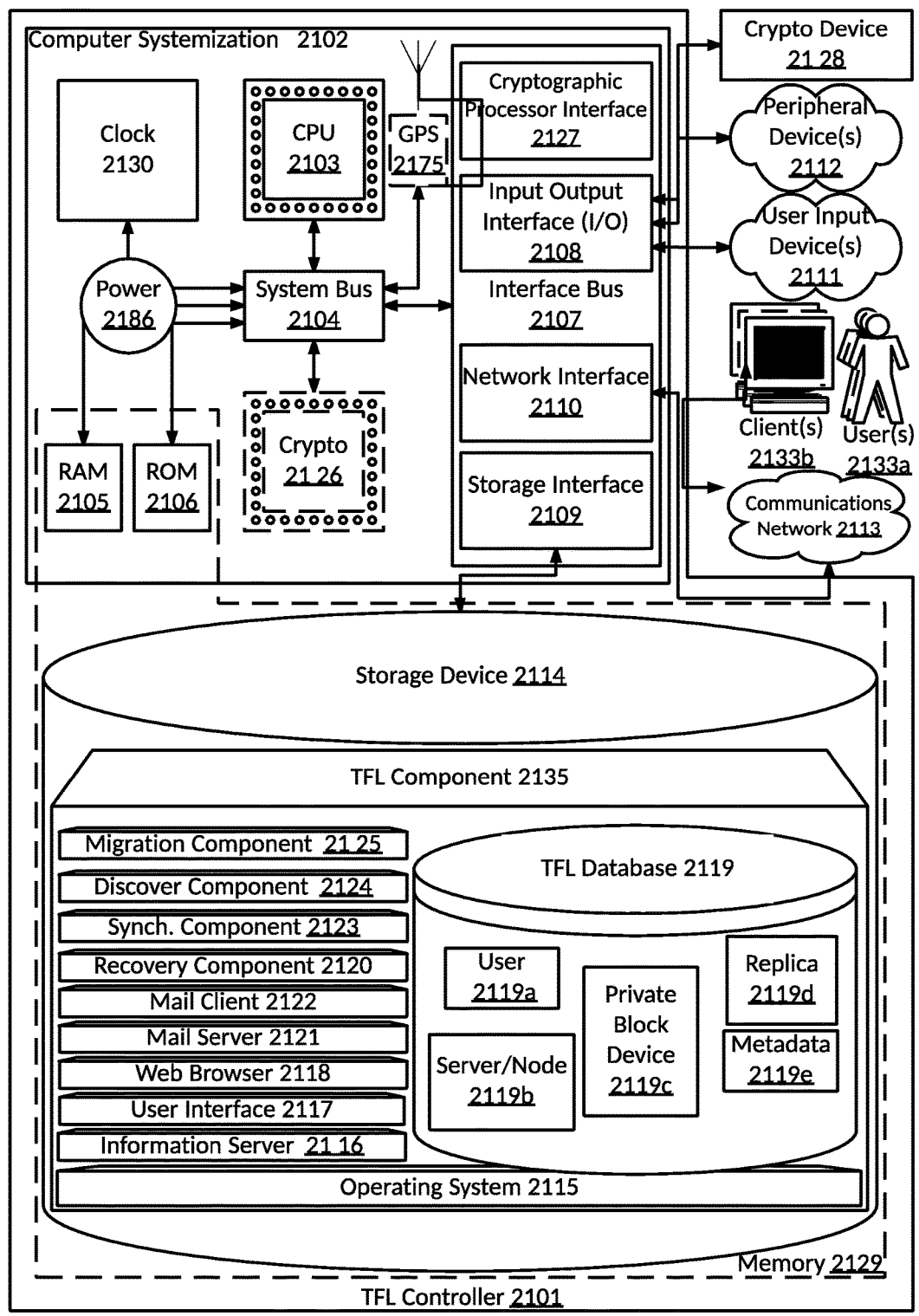
FIG. 21 is a block diagram illustrating embodiments of a TFL controller.

FIG. 21 illustrates inventive aspects of a TFL controller 2101 in a block diagram. In this embodiment, the TFL controller 2101 may serve to aggregate, process, store, search, serve, identify, instruct, generate, match, and/or facilitate interactions with a computer through vulnerability management technologies, and/or other related data.

Typically, users, which may be people and/or other systems, may engage information technology systems (e.g., computers) to facilitate information processing. In turn, computers employ processors to process information; such processors 2103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the TFL controller 2101 may be connected to and/or communicate with entities such as, but not limited to: one or more users from user input devices 2111; peripheral devices 2112; an optional cryptographic processor device 2128; and/or a communications network 2113.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The TFL controller 2101 may be based on computer systems that may comprise, but are not limited to, components such as: a computer systemization 2102 connected to memory 2129.

Computer Systemization

A computer systemization 2102 may comprise a clock 2130, central processing unit ("CPU(s)" and/or "processor(s)" (these terms are used interchangeable throughout the disclosure unless noted to the contrary)) 2103, a memory 2129 (e.g., a read only memory (ROM) 2106, a random access memory (RAM) 2105, etc.), and/or an interface bus 2107, and most frequently, although not necessarily, are all interconnected and/or communicating through a system bus 2104 on one or more (mother)board(s) 2102 having conductive and/or otherwise transportive circuit pathways through which instructions (e.g., binary encoded signals) may travel to effect communications, operations, storage, etc. Optionally, the computer systemization may be connected to an internal power source 2186. Optionally, a cryptographic processor 2126 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the TFL controller and beyond through various interfaces. Should processing requirements dictate a greater amount speed and/or capacity, distributed processors (e.g., Distributed TFL), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the TFL may be achieved by implementing a microcontroller such as CAST's R8051XC2 microcontroller; Intel's MCS 51 (i.e., 8051 microcontroller); and/or the like. Also, to implement certain features of the TFL, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the TFL component collection (distributed or otherwise) and/or features may be implemented via the microprocessor and/or via embedded components; e.g., via ASIC, coprocessor, DSP, FPGA, and/or the like. Alternately, some implementations of the TFL may be implemented with embedded components that are configured and used to achieve a variety of features or signal processing.

Depending on the particular implementation, the embedded components may include software solutions, hardware solutions, and/or some combination of both hardware/software solutions. For example, TFL features discussed herein may be achieved through implementing FPGAs, which are a semiconductor devices containing programmable logic components called "logic blocks," and programmable interconnects, such as the high performance FPGA Virtex series and/or the low cost Spartan series manufactured by Xilinx. Logic blocks and interconnects can be programmed by the customer or designer, after the FPGA is manufactured, to implement any of the TFL features. A hierarchy of programmable interconnects allow logic blocks to be interconnected as needed by the TFL system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the TFL may be developed on regular FPGAs and then migrated into a fixed version that more resembles ASIC implementations. Alternate or coordinating implementations may migrate TFL controller features to a final ASIC instead of or in addition to FPGAs. Depending on the implementation all of the aforementioned embedded components and microprocessors may be considered the "CPU" and/or "processor" for the TFL.

Power Source

The power source 2186 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2186 is connected to at least one of the interconnected subsequent components of the TFL thereby providing an electric current to all subsequent components. In one example, the power source 2186 is connected to the system bus component 2104. In an alternative embodiment, an outside power source 2186 is provided through a connection across the I/O 2108 interface. For example, a USB and/or IEEE 1394 connection carries both data and power across the connection and is therefore a suitable source of power.

Interface Adapters

Interface bus(ses) 2107 may accept, connect, and/or communicate to a number of interface adapters, conventionally although not necessarily in the form of adapter cards, such as but not limited to: input output interfaces (I/O) 2108, storage interfaces 2109, network interfaces 2110, and/or the like. Optionally, cryptographic processor interfaces 2127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2109 may accept, communicate, and/or connect to a number of storage devices such as, but not limited to: storage devices 2114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2110 may accept, communicate, and/or connect to a communications network 2113. Through a communications network 2113, the TFL controller is accessible through remote clients 2133*b* (e.g., computers with web browsers) by users 2133*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed TFL), architectures may similarly be employed to pool, load balance, and/or otherwise increase the communicative bandwidth required by the TFL controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2110 may be used to engage with various communications network types 2113. For example, multiple network interfaces may be employed to allow for the communication over broadcast, multicast, and/or unicast networks.

Input Output interfaces (I/O) 2108 may accept, communicate, and/or connect to user input devices 2111, peripheral devices 2112, cryptographic processor devices 2128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2111 may be card readers, dongles, finger print readers, gloves, graphics tablets, joysticks, keyboards, mouse (mice), remote controls, retina readers, trackballs, trackpads, touchpads, and/or the like.

Peripheral devices 2112 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the TFL controller may be embodied as an embedded, dedicated, and/or monitor-less (i.e., headless) device, wherein access would be provided over a network interface connection.

Cryptographic units such as, but not limited to, microcontrollers, processors 2126, interfaces 2127, and/or devices 2128 may be attached, and/or communicate with the TFL controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2129. However, memory is a fungible technology and resource, thus, any number of memory embodiments may be employed in lieu of or in concert with one another. It is to be understood that the TFL controller and/or a computer systemization may employ various forms of memory 2129. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 2129 will include ROM 2106, RAM 2105, and a storage device 2114. A storage device 2114 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2129 may contain a collection of program and/or database components and/or data such as, but not limited to: operating system component(s) 2115 (operating system); information server component(s) 2116 (information server); user interface component(s) 2117 (user interface); Web browser component(s) 2118 (Web browser); database(s) 2119; mail server component(s) 2121; mail client component(s) 2122; cryptographic server component(s) 2120 (cryptographic server); the TFL component(s) 2135; and/or the like (i.e., collectively a component collection). These components may be stored and accessed from the storage devices and/or from storage devices accessible through an interface bus. Although non-conventional program components such as those in the component collection, typically, are stored in a local storage device 2114, they may also be loaded and/or stored in memory such as: peripheral devices, RAM, remote storage facilities through a communications network, ROM, various forms of memory, and/or the like.

The memory 2129 may contain a collection of program and/or database components and/or data such as, but not limited to: operating system component(s) 2115 (operating system); information server component(s) 2116 (information server); user interface component(s) 2117 (user interface); Web browser component(s) 2118 (Web browser);

database(s) 2119; mail server component(s) 2121; mail client component(s) 2122; recovery component(s) 2120 (cryptographic server); synchronization component 2123; discover component 2124; migration component 2125; the TFL component(s) 2135; the other components (not shown), and/or the like (i.e., collectively a component collection). These components may be stored and accessed from the storage devices and/or from storage devices accessible through an interface bus. Although non-conventional program components such as those in the component collection, typically, are stored in a local storage device 314, they may also be loaded and/or stored in memory such as: peripheral devices, RAM, remote storage facilities through a communications network, ROM, various forms of memory, and/or the like.

Operating System

The operating system component 2115 is an executable program component facilitating the operation of the TFL controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server)/7/8, Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the TFL controller to communicate with other entities through a communications network 2113. Various communication protocols may be used by the TFL controller as a subcarrier transport mechanism for interaction, such as, but not limited to: multicast, TCP/IP, UDP, unicast, and/or the like.

Information Server

An information server component 2116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the TFL controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the TFL database 2119, operating systems, other program components, user interfaces, Web browsers, and/or the like.

Access to the TFL database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the TFL. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the TFL as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero)/8, Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the TFL enabled nodes. The combined application may be nugatory on systems employing standard Web browsers.

Mail Server

A mail server component 2121 is a stored program component that is executed by a CPU 2103. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the TFL.

Access to the TFL mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2122 is a stored program component that is executed by a CPU 2103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2120 is a stored program component that is executed by a CPU 2103, cryptographic processor 2126, cryptographic processor interface 2127, cryptographic processor device 2128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the TFL may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the TFL component to engage in secure transactions if so desired. The cryptographic component facilitates the secure accessing of resources on the TFL and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The TFL Database

The TFL database component 2119 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the TFL database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the TFL database is implemented as a data-structure, the use of the TFL database 2119 may be integrated into another component such as the TFL component 2135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 319 includes several tables 2119a-e. A user accounts table 2119a may include fields such as, but not limited to: user_id, name, contact_info, account_identifier, parent_account_identifier, market_participant_id, login, password, private_key, public_key, user_interface_interactions, content_ID, ad_ID, device_ID, and/or the like. The user table may support and/or track multiple entity accounts in TFL. A device or server/node table 2119b may include fields such as, but not limited to: device_ID, user_ID, device_type, device_make, device_model, device_capabilities, last_synchronization-_time, ad_ID, and/or the like. A private block device table 2119c may include fields such as, but not limited to: private block code, and/or the like. A replica table 2119d may include fields such as, but not limited to: replica_location and/or the like. A metadata table 2119e may include fields such as, but not limited to: metadata_value, and/or the like.

In one embodiment, user programs may contain various user interface primitives, which may serve to update the TFL. Also, various accounts may require custom database tables depending upon the environments and the types of clients the TFL may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2119a-d. The TFL may be configured to keep track of various settings, inputs, and parameters via database controllers.

The TFL database may communicate to and/or with other components in a component collection, including itself, and/or facilities of the like. Most frequently, the TFL database communicates with the TFL component, other program components, and/or the like. The database may contain, retain, and provide information regarding other nodes and data.

The TFLs

The TFL component 2135 is a stored program component that is executed by a CPU. In one embodiment, the TFL component incorporates any and/or all combinations of the aspects of the TFL that was discussed in the previous figures. As such, the TFL affects accessing, obtaining and the provision of information, services, transactions, and/or the like across various communications networks.

The TFL component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the TFL server employs a cryptographic server to encrypt and decrypt communications. The TFL component may communicate to and/or with other components in a component collection, including itself, and/or facilities of the like. Most frequently, the TFL component communicates with the TFL database, operating systems, other program components, and/or the like. The TFL may contain, communicate, generate, obtain, and/or provide program component, system, user, and/or data communications, requests, and/or responses.

Distributed TFLs

The structure and/or operation of any of the TFL node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the TFL controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

To address various issues related to, and improve upon, previous work, the application is directed to TIERED HETEROGENEOUS FAST LAYER SHARED STORAGE SUBSTRATE APPARATUSES, METHODS, AND SYSTEMS. The entirety of this application shows by way of illustration various embodiments. The advantages and features disclosed are representative; they are not exhaustive or exclusive. They are presented only to assist in understanding and teaching the claimed principles. It should be understood that they are not representative of all claimed inventions. As such, certain aspects of the invention have not been discussed herein. That alternate embodiments may not have been presented for a specific portion of the invention or that further undescribed alternate embodiments may be available for a portion of the invention is not a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the invention. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functionality, features, logical aspects, organizational aspects, structural aspects, topological aspects, and other aspects of the disclosure are not to be considered limitations on the disclosure as defined by the claims or limitations on equivalents to the claims.

The invention claimed is:

1. A storage system for organizing and maintaining metadata in a distributed network, the storage system comprising:
a network;
a plurality of distributed nodes configured to communicate through the network;
a plurality of block devices configured to store data, the plurality of block devices communicatively coupled to the plurality of distributed nodes; and
a management server configured to:
communicate with each of the plurality of distributed nodes and block devices; and
associate metadata and data to any of the plurality of distributed nodes such that a global copy of the metadata does not exist in one or more fixed locations known to all distributed nodes, wherein the management server arbitrarily associates the metadata and the data to different nodes of the plurality of nodes by assigning each request to write new data to the storage system to a local node of the plurality of distributed nodes,
wherein each respective node of the plurality of distributed nodes is configured to:
maintain precise metadata for data stored at one or more block devices of the plurality of block devices local to the respective node without maintaining any metadata for data stored at other block devices of the plurality of block devices local to other nodes of the plurality of distributed nodes;
determine, based on the metadata maintained by the respective node, whether a received data request is a local data request or a remote data request, wherein a local data request corresponds to a data request associated with data stored at the one or more block devices local to the respective node and a remote data request corresponds to a data request associated with data stored at the other block devices local to the other nodes;
in response to a local data request, serve requested data associated with the received data request based on the data stored at the one or more block devices local to the respective node;
in response to a remote data request:
query the other nodes to identify one or more of the other nodes local to at least one block device storing the data associated with the data request; and
serve requested data associated with the received data request based on the data stored local to a particular one of the identified other nodes;
determine performance metrics including at least one of a latency associated with data served from the one or more block devices local to the respective node, energy efficiency information associated with serving requested data from the one or more block devices local to the respective node, and information indicating a frequency of access with respect to the data stored at the one or more block devices local to the respective node; and
migrate particular data stored at the one or more block devices local to the respective node to one of the other block devices local to the other nodes based on a determination that migration of the particular data improves at least one of the performance metrics.

2. The storage system of claim 1, wherein the system is further configured to handle concurrent access from different distributed nodes that host replicas locally by allowing writes and reads to the replicas to progress independently for each replica and to detect conflicting writes that leave the replicas in an inconsistent state, and applying a protocol to bring the replicas into a consistent state.

3. The storage system of claim 1, further comprising an interface that permits a user to monitor and perform changes to a state and configuration of the storage system.

4. The storage system of claim 1, wherein management server comprises a replicated management server.

5. The storage system of claim 1, wherein the storage system is configured to allow concurrent access of metadata and data from user space and kernel space.

6. The storage system of claim 1, wherein the plurality of block devices includes at least two block devices having different characteristics.

7. The storage system of claim 1, wherein the management server is configured to persistently modify metadata only during management operations and not during read and write operations.

8. The storage system of claim 1, wherein the management server is configured to maintain the metadata per extent, such that management operations occur at extent granularity.

9. The storage system of claim 1, wherein each distributed node is configured to independently determine whether to declare another node dead or declare itself dead and stop operating, by periodically pinging every other distributed node in the storage system and waiting for a threshold number of responses.

10. The storage system of claim 1, wherein the metadata comprises a persistent metadata segment stored on a particular block device, and wherein the persistent metadata is only updated if the persistent metadata itself changes, regardless of changes to the data associated with the persistent metadata.

11. The storage system of claim 10, wherein the storage system is further configured to store an ancestry tree for each data extent in a corresponding persistent metadata segment and to compare that ancestry tree to a full ancestry tree that describes a snapshot history when a read or write operation is performed, such that the storage system is able to read and write previous snapshots of the data and allows fast access to a latest snapshot when the data is present at a block device local the node that serves the read or write operation.

12. The storage system of claim 1, wherein each distributed node is configured to independently determine where to move data that are stored on its block devices to devices associated with other distributed nodes.

13. A non-transitory computer-readable storage medium storing instructions that, when executed by one or more processors, cause the one or more processors to perform operations for serving data in a distributed network, the operations comprising:
- associating metadata and data to any of a plurality of distributed nodes of a storage system such that a global copy of the metadata does not exist in one or more fixed locations known to all distributed nodes by at least assigning each request to write new data to the storage system to a local node of the plurality of distributed nodes, wherein the storage system comprises a plurality of block devices configured to store data, and wherein the plurality of block devices are communicatively coupled to different ones of the plurality of distributed nodes;
- maintain, by each respective node of the plurality of distributed nodes, precise metadata for data stored at one or more block devices of the plurality of block devices local to the respective node without maintaining any metadata for data stored at other block devices of the plurality of block devices local to other nodes of the plurality of distributed nodes receiving data request at a distributed node of the plurality of distributed nodes from a locally running application via a network;
- determining, by the distributed node, whether the data request is a local data request based on the metadata maintained by the distributed node, wherein a local data request corresponds to a data request associated with data stored at one or more block devices local to the distributed node and a remote data request corresponds to a data request associated with data stored at other block devices local to other distributed nodes of the plurality of distributed nodes;
- when the data request is the local data request, using metadata maintained by the distributed node to serve data corresponding to the data request;
- when the data is the remote data request, querying the other distributed nodes to identify one or more of the other distributed nodes local to at least one block device storing the data associated with the data request serving the requested data based on the data stored local to a particular one of the identified other nodes;
- determining, by the distributed node, performance metrics including at least one of a latency associated with data served from the one or more block devices local to the distributed node, energy efficiency information associated with serving requested data from the one or more block devices local to the distributed node, and information indicating a frequency of access with respect to the data stored at the one or more block devices local to the distributed node; and
- migrating, by the distributed node, particular data stored at the one or more block devices local to the distributed node to one of the other block devices local to the other nodes based on a determination that migration of the particular data improves at least one of the performance metrics.

14. A processor-implemented method of organizing and maintaining metadata and serving data in a distributed network, the method comprising:
- associating, by a management server, metadata to any of a plurality of distributed nodes on a network, wherein each of the plurality of distributed nodes is communicatively coupled to a block device of a plurality of block devices, such that a global copy of the metadata does not exist in one or more fixed locations known to all distributed nodes, and wherein the associating the metadata and the data to different nodes of the plurality of nodes comprises:
  - assigning each request to write new data to a storage system to a local node of the plurality of distributed nodes;
- maintaining, by each respective node of the plurality of distributed nodes, precise metadata for data stored at the block device associated with the respective node without maintaining any metadata for data stored at other block devices of the plurality of block devices associated with other nodes of the plurality of distributed nodes;
- determining, by a particular node of the plurality of distributed nodes, whether a received data request is a local data request or a remote data request based on particular metadata maintained by the particular node, wherein a local data request corresponds to a data request associated with data stored at the block device associated with the particular node and a remote data request corresponds to a data request associated with data stored at other block devices associated with the other nodes;
- serving, by the particular node, requested data associated with the received data request based on the data stored at the block device associated with the particular node in response to a local data request;
- in response to a remote data request:
  - querying the other nodes to identify one or more of the other nodes associated with at least one block device storing the data associated with the data request; and
  - serving requested data associated with the received data request based on the data stored at one of the at least one block devices associated with one of the identified other nodes;
- determining, by the particular node, performance metrics including at least one of a latency associated with data served from the one or more block devices local to the respective node, energy efficiency information associated with serving requested data from the one or more block devices local to the respective node, and information indicating a frequency of access with respect to the data stored at the one or more block devices local to the respective node; and
- migrating, by the particular node, particular data stored at the block device associated with the particular node to one of the other block devices associated with the other nodes based on a determination that migration of the particular data improves at least one of the performance metrics.

15. The method of claim 14, further comprising handling concurrent accesses from different distributed nodes that host replicas locally by allowing writes and reads to the replicas to progress independently for each replica to detect conflicting writes that leave the replicas in an inconsistent state, and applying a protocol to bring all replicas into a consistent state.

16. The method of claim 14, further comprising independently determining, by each distributed node, whether to declare another node dead or declare itself dead by periodically pinging every other distributed node in the network and waiting for a threshold number of responses.

17. The method of claim 14, further comprising storing an ancestry tree for each of a plurality of data extents on a block device associated with at least one of the distributed nodes in a corresponding persistent metadata segment, and comparing the ancestry tree to a full ancestry tree that describes a snapshot history when a read or write operation is performed, such that the storage system is able to read and write previous snapshots of the data and allows fast access to a latest snapshot when the data is present in a block device local to the node that serves the read or write operation.

18. The method of claim 14, further comprising, at each distributed node, independently determining where to move data that are stored on the block devices associated with the distributed nodes.

* * * * *